(12) United States Patent
Aher et al.

(10) Patent No.: US 11,838,256 B2
(45) Date of Patent: Dec. 5, 2023

(54) SYSTEMS AND METHODS FOR DYNAMICALLY ROUTING APPLICATION NOTIFICATIONS TO SELECTED DEVICES

(71) Applicant: Rovi Guides, Inc., San Jose, CA (US)

(72) Inventors: Ankur Anil Aher, Maharashtra (IN); Charishma Chundi, Andhra Pradesh (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/496,599

(22) Filed: Oct. 7, 2021

(65) Prior Publication Data

US 2023/0115319 A1     Apr. 13, 2023

(51) Int. Cl.
*H04L 51/226*     (2022.01)
*H04L 51/224*     (2022.01)

(52) U.S. Cl.
CPC .......... *H04L 51/226* (2022.05); *H04L 51/224* (2022.05)

(58) Field of Classification Search
CPC ........................ H04L 51/224; H04L 51/226
See application file for complete search history.

(56) References Cited

U.S. PATENT DOCUMENTS

| | | |
|---|---|---|
| 9,462,570 B1 | 10/2016 | Bostick et al. |
| 9,569,426 B1 | 2/2017 | Bostick et al. |
| 10,834,219 B1 | 11/2020 | Justin et al. |
| 2006/0240803 A1 | 10/2006 | Valeriano et al. |
| 2012/0032783 A1* | 2/2012 | Ahn .................... H04N 21/4424 340/6.1 |
| 2014/0195620 A1 | 7/2014 | Srinivasan et al. |
| 2015/0061862 A1 | 3/2015 | Lee et al. |
| 2015/0207916 A1* | 7/2015 | Xue ......................... H04W 8/22 455/412.2 |
| 2015/0350146 A1* | 12/2015 | Cary ...................... H04L 51/046 709/206 |
| 2016/0057086 A1* | 2/2016 | Zhang ................... H04L 51/224 709/206 |
| 2016/0057610 A1 | 2/2016 | Cronin |
| 2016/0142087 A1* | 5/2016 | Inampudi ................. H04W 4/90 455/558 |
| 2016/0248865 A1 | 8/2016 | Dotan-Cohen et al. |

(Continued)

FOREIGN PATENT DOCUMENTS

| | | |
|---|---|---|
| CN | 110740356 A | 1/2020 |
| EP | 3796683 A1 | 3/2021 |

(Continued)

OTHER PUBLICATIONS

"Notification Presentation Across Multiple Devices", IP.com No. IPCOM000252371D, 2018.

(Continued)

*Primary Examiner* — Kostas J Katsikis
(74) *Attorney, Agent, or Firm* — Haley Guiliano LLP

(57) ABSTRACT

Systems and methods for dynamically routing notifications based on device statuses are disclosed herein. For instance, a notification may be generated for a user account corresponding to an application that is installed on a plurality of devices. A system identifies a status of each of the plurality of devices and uses the status of each of the plurality of devices to select a particular device to receive the notification. The system then transmits the notification to the selected particular device.

20 Claims, 12 Drawing Sheets

(56) References Cited

U.S. PATENT DOCUMENTS

| | | |
|---|---|---|
| 2017/0180502 A1 | 6/2017 | Lewis et al. |
| 2017/0280318 A1 | 9/2017 | Steidley |
| 2017/0289087 A1 | 10/2017 | Chang et al. |
| 2017/0359798 A1* | 12/2017 | Bradley .................. H04L 51/58 |
| 2018/0007091 A1* | 1/2018 | Rajapakse ............. H04L 12/189 |
| 2019/0082416 A1* | 3/2019 | DeLuca .............. H04W 68/005 |
| 2019/0109918 A1* | 4/2019 | Milanese ................ G06F 3/167 |
| 2019/0356750 A1 | 11/2019 | Dotan-Cohen et al. |
| 2020/0127911 A1* | 4/2020 | Gilson .................... H04L 47/24 |

FOREIGN PATENT DOCUMENTS

| | | |
|---|---|---|
| JP | 2020098459 A | 6/2020 |
| KR | 20210034875 A | 3/2021 |
| WO | 2012164146 A1 | 12/2012 |
| WO | WO-2014105746 A1 * | 7/2014 ............. H04L 51/24 |

OTHER PUBLICATIONS

"Notifications Management Across Devices", IP.com No. IPCOM000252936D, 2018.

"Selective Notifications Based on Message Priority Determination", IP.com No. IPCOM000252680D, 2018.

Alghamdi, Yousef, et al., "Activity-Based Cloud Sending: Push Services for User Device Multiplicity", 12th Annual IEEE Consumer Communications and Networking Conference (CCNC), 2015.

\* cited by examiner

SYSTEMS AND METHODS FOR DYNAMICALLY ROUTING APPLICATION NOTIFICATIONS TO SELECTED DEVICES

BACKGROUND

This disclosure is generally directed to message transmitting and routing to client devices. In particular, methods and systems are provided for routing notifications to client devices based on device statuses.

SUMMARY

Modernly, there is a trend in application technology to provide a single application on multiple devices. One of the earliest examples of this trend is communications applications, such as email or instant messaging, which moved from purely being installed in a desktop environment to being available on a laptop, tablet, mobile phone, blackberry, or any other device with internet access. This trend has expanded to include different types of applications, such as media applications, including games, music, movies, and books, social network applications, other types of messaging applications, and the like. Additionally, the number of devices on which these applications are accessible has increased, with personal computer gaming applications being available on smartphones that cannot play the games or social network applications being available on smart refrigerators.

A second popular trend is the use of notifications to inform users of an application of changes to an account or to prompt the users to perform specific actions. For instance, initially with email applications, a user would not know that a new email had been received unless the user opened an email application and selected an option to request new messages. In contrast, modern email applications generate a notification for a user when an email is received, either through a push notification where a server sends a message to the device to cause the device to display the notification or through a pull notification where a device periodically sends requests to the server for new notifications to be displayed on the device.

While access to applications on multiple devices can grant greater ability and freedom when utilizing the applications, the installation of the same application on multiple devices can lead to unwanted duplication of notifications. For instance, if four devices—a phone, a smart tv, a desktop computer, and a tablet—all contain the same application, then a generated notification for the application would be displayed on all devices. In addition to annoying a user by displaying a notification in multiple locations, this duplication of notifications generates unwanted network traffic and unnecessarily utilizes power on more devices than necessary. In instances of low power devices, such as smartwatches and mobile phones, each additional notification received by the device reduces the device's battery, thereby decreasing the amount of time that the device can be used prior to charging.

To address the aforementioned problem, in one approach, "Do not disturb" settings are available for notifications on a specific device. The "Do not disturb" settings allow a user to specify that they do not want to receive notifications on a specific device or to set specific notification exclusions for specific applications. As an example, a user may select an option through a tablet's operating system or through application settings to cause the tablet to not display notifications for an email application, while notifications are still displayed on a mobile device. This approach is deficient because it is not adaptable to different situations and requires user adjustment. For example, if a user places the mobile device down and walks into another room with the tablet, any email notifications that are received will be missed. For the user to receive the notifications on the tablet, the user would have to access the application or system settings, enable the notifications, and then perform the same actions to disable the notifications when done using the tablet. This inconvenience may cause notifications to be missed when devices are switched or to be unnecessarily duplicated in instances where notification settings are too difficult or inconvenient to switch. Additionally, user-driven settings create the aforementioned problems in instances of bad timing, whereby setting the notification settings too late causes the aforementioned waste of resources and setting the notification settings too early causes notifications to be missed. As an additional issue, the "Do not disturb" settings often do not stop the notification from being sent to the client device, but instead merely stop the notification from being displayed on the client device. Thus, even with the "Do not disturb" settings, resources are being wasted through the sending of notifications to each device.

Another approach to addressing this problem is to enable or disable notifications for a device based on that device's status. For example, notifications may be turned off for a device when the device is in a locked state, but turned on for the device when the device is in an unlocked state. This approach is deficient because, like the previous approach, it has to be manually set. Additionally, this approach does not dynamically take other factors into account, thereby still causing duplication of notifications in some instances or a loss of notifications in other instances. Additionally, both of the above approaches may lead to notifications being received on a non-optimal device. For example, if a notification for a gaming application is sent to a device that cannot execute the game or is less likely to execute the game, then the notification is likely to be dismissed on the device prior to the application being executed on the optimal device and a user manually navigating through the application to find the notification or feature related to the notification.

To overcome such deficiencies, methods and systems are described herein for dynamically routing notifications to devices based on device statuses. When a notification corresponding to an application is identified that is directed to a particular device, a computing device uses stored account data to identify a plurality of devices on which the application is installed that could potentially receive the notification. The computing device then determines a current status for each of the plurality of devices and uses the current status of each of the devices to determine to which device to route the notification.

The present disclosure addresses the problems of 1) duplication of notifications across multiple devices, 2) missed notifications due to routing settings, and 3) display of notifications on non-optimal devices. For example, by dynamically selecting a device to receive a notification based on a then-current status of a plurality of devices, the system is able to identify an optimal device to receive the notification, thereby ensuring that the notification is not missed and that notifications are not duplicated across multiple devices.

In one embodiment, the computing device tracks viewing or response to the notification. If the notification is not viewed or no interaction with the notification occurs within a threshold period of time, the computing device may forward the notification to a second device, also determined based on then-current statuses of the devices. In this way, the system is able to ensure that notifications are not missed even when they are not viewed after optimal routing. In some embodiments, the additional routing of notifications is performed in response to a determination that the notification has an urgency level that is greater than a threshold urgency level. The determination of the urgency level may be performed by the computing device, by a client device that receives the notification, or by an application server that sent the notification.

In an embodiment, the computing device selects the device to send the notification to based on a priority score computed from two or more features. For instance, a plurality of factors, such as a determined proximity of the device to a user of the device, device settings that affect alerts, device health information, information relating to when the device was last used, user preference information relating to the application, or network information, may be used to compute a priority score for each of the plurality of devices. The system may route the notification to the device with the highest priority score. In embodiments where the system routes the notification to a second device, the system may select as the second device the device with the second highest priority score.

In an embodiment, the computing device uses historical application usage data and/or historical application notification usage data to select the device to receive the notification. For example, the computing device may select the device that has the greatest percentage of usage of the application, the greatest amount of time of usage of the application, the greatest number of times the application was accessed, or any other measure of application usage. Alternatively, the system may select the device that has interacted with notifications the most or interacted with notifications the most initially, even when the application is not a most-used application. For example, a tablet device may be used the most for reading books in a book application, but a mobile phone may be used the most to respond to notifications from the book application, such as notifications relating to a new book release. The system may route the notification to the mobile phone based on notification interactions instead of the book based on application usage. As another example, a user may interact with notifications on each of a plurality of devices as they are received, but may initially interact with the notifications on the mobile phone over the other devices. Based on the higher number of initial application notification interactions, the system may select the mobile phone.

In an embodiment, the current status of the plurality of devices is different for each device depending on one or more factors, such as a device type. For example, the system may determine whether a smart television is currently on and whether a mobile device is within a threshold distance of the smart television. If both are true, the system may route the notification to the smart television. If the smart television is off and/or the mobile device is not within a threshold distance of the smart television, the system may route the notification to the mobile device.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
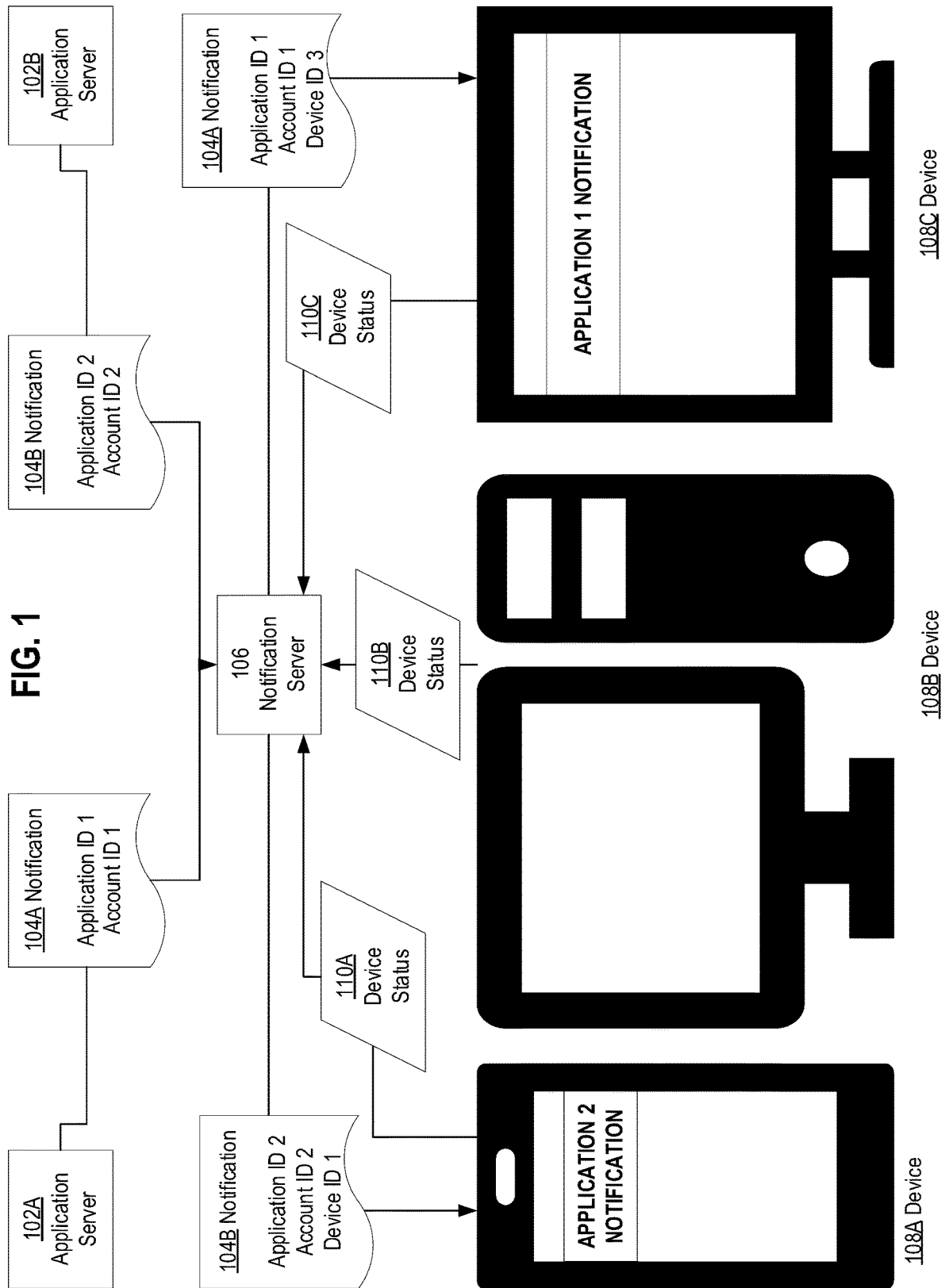
FIG. 1 depicts an example system for dynamically routing application notifications, in accordance with some embodiments of the disclosure.

FIG. 1 depicts an example system for dynamically routing application notifications. System 100 comprises application server 102A, application server 102B, notification server 106, device 108A, device 108B, and device 108C. FIG. 1 provides a practical example of a system; one skilled in the art would recognize that more or less suitable elements may be used to perform the methods described herein. For example, the notification server 106 may receive notifications from any number of application servers and may communicate with any number of client devices. As another example, the actions of the notification server may be performed by a controller device, by the application server 102, or by one of the client devices 108, such as a client device that is configured to receive notifications first and then forward those notifications to other client devices.

In the exemplary embodiment depicted in FIG. 1, application server 102A and application server 102B each comprise one or more server computers that provide an application to one or more client devices. In the exemplary embodiment depicted in FIG. 1, two different application servers 102A and 102B correspond to different applications provided to the user devices 108. The application servers 102A and 102B may transmit notifications 104A and 104B, respectively. Transmitting the notification may comprise directly sending the notification to the user devices 108 when the notification is generated or storing the notification and sending the notification to the user devices 108 in response to a request for new notifications.

Notifications 104 comprise data that is displayed as an alert on a client device and/or is used to generate an alert on a client device. In one example, the notification comprises updates to a client account for a particular application which a client device executing the application uses to generate a display of an update that is depicted on a home screen, lock screen, as a overlay over a graphical user interface, and/or in a portion of a user interface that is configured to display notifications. In another example, a new email that is received for an account of an email application may be used to generate a new email notification. Additionally or alternatively, the notification 104 may comprise notification data that is to be displayed as part of the notification on the client device.

In some embodiments, the notifications are directed to a user account. "Directed to a user account," as used herein, refers to the notification being sent to user devices corresponding to a user account and/or being transmitted with data that identifies a user account identifier as a recipient of the notification. For example, the notification may be stored at a server computer with an account identifier. When a request for new notifications is received that includes the account identifier, the notification may be identified. As another example, the notification may include, such as in a header of the notification, an account identifier that identifies the account to which the notification is directed.

In the exemplary embodiment depicted in FIG. 1, notification 104A and notification 104B may include a notification payload, an application identifier, and an account identifier. The notification payload may include notification content, such as images or information to be displayed and/or links that, when selected, navigate to actions to be performed in an application, and/or notification formatting, such as data indicating how the notification is to be displayed on one or more devices. The application identifier comprises a unique identifier of the application that corresponds to the notification. The account identifier comprises a unique identifier of the account to which the notification is directed.

In the exemplary embodiment depicted in FIG. 1, notification server 106 comprises one or more computing devices configured to receive notifications, identify recipient devices, and route notifications to the recipient devices. While the notification server is depicted as a separate element in FIG. 1, in other embodiments the actions performed by notification server 106 may be performed by the application servers and/or by one or more of the user devices 108. Notification server 106 may be configured according to embodiments described with reference to FIGS. 10 and 11. Thus, notification server 106 may comprise control circuitry 1004 and I/O path 1002, which execute instructions to perform embodiments described herein.

In some embodiments, notification server 106 is communicatively coupled to a plurality of client devices 108, such as device 108A, device 108B, and device 108C. Client devices 108 comprise computing devices that execute an application corresponding to a notification transmitted by an application server. For the purpose of providing a clear example, device 108A is depicted as a mobile device, device 108B is depicted as a desktop computer, and device 108C is depicted as a television, but other embodiments may include any type of computing device, such as a laptop, smartwatch, smart fridge, tablet, mobile phone, music player, gaming system, or any other computing device capable of executing the application and communicating with an application server over one or more networks.

In some embodiments, devices 108 send device statuses 110 to notification server 106. The devices 108 may be configured to periodically send device statuses 110 to notification server 106, send devices statuses 110 to notification server 106 in response to detecting a change to a device status, and/or send device statuses 110 to notification server 106 in response to a request from notification server 106 for device statuses. Examples of device statuses are described further herein.

In an embodiment, notification server 106 uses the device statuses to determine where to route the notifications 104. Methods for routing notifications based on device statuses are described further herein. In an embodiment, notification server 106 appends a device identifier to the notifications 104 prior to routing the notifications to the selected device. For example, in FIG. 1, after determining that notification 104A is to be routed to device 108C, the system appends device ID 3 to notification 104A, such as in a header of the notification. In addition, in FIG. 1, after determining that notification 104B is to be routed to device 108A, the system appends device ID 1 to notification 104B. The system may then transmit the notification to the devices 108 and/or wait for a request from one of devices 108 and identify notifications available for the one of devices 108 based on a device identifier of the one of devices 108 matching device identifiers in the notifications.

Notification Routing

Figure 2:
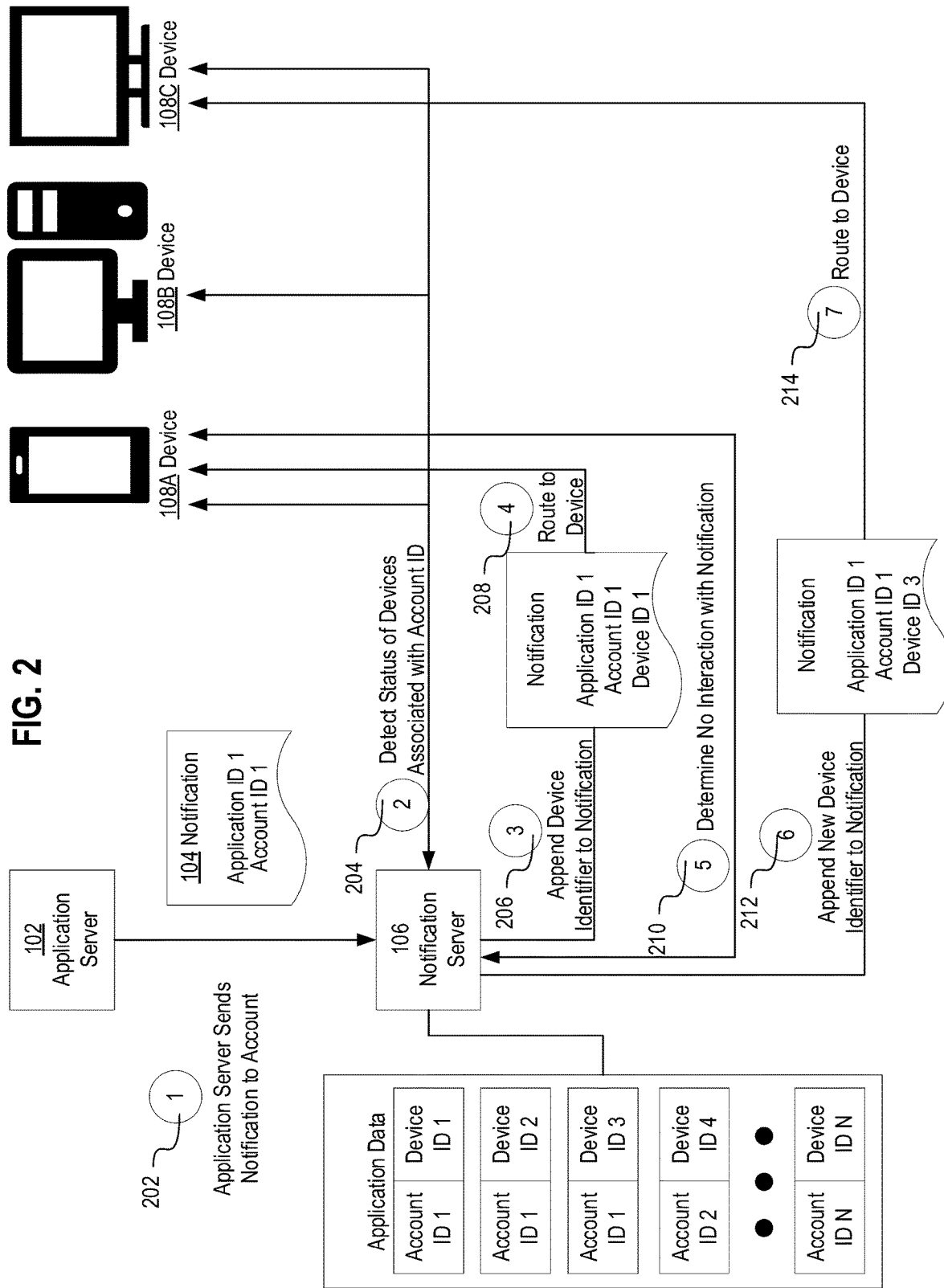
FIG. 2 depicts an example method for dynamically routing notifications, in accordance with some embodiments of the disclosure.

FIG. 2 depicts an example method for dynamically routing notifications. It should be noted that embodiments depicted in any of FIG. 2-9 or 12 may be performed by control circuitry 1004 and I/O path 1002 of FIG. 10 by the notification server. In an example, the I/O path 1002 of FIG. 10 is configured to perform the notification receiving and routing of FIG. 2-9 or 12, and the control circuitry 1004 is configured to apply one or more rules to statuses of recipient devices to identify to which device to route the notification. In addition, one or more steps of the embodiments of any of FIG. 2-9 or 12 may be incorporated into or combined with one or more steps of any other processes or embodiments described in the present disclosure.

At step 202, the application server 102 transmits a notification 104, which is directed to a user account. For example, the application server 102 may send data comprising a notification header and notification payload to the notification server 106. The application server 102 may transmit the notification in response to requests for notifications that correspond to a specific account identifier, in response to generating the notification, and/or periodically. In an embodiment, the notification is considered "directed to" a user account if data, such as data stored in storage 1008 of FIG. 10, indicates that the notification is to be displayed on client devices that are signed in to the user account. The "directed to" component of the notification may be satisfied by a stored account identifier being stored in association with the notification, such that the notification is routed to devices that execute the application and are signed in to the client account. An example notification structure is depicted below:

| Header | | | | |
|---|---|---|---|---|
| Application ID | Account ID | Type ID | Urgency ID | Destination ID |
| Payload | | | | |

The above example notification structure includes a header that comprises an application identifier, an account identifier, a notification type identifier, an urgency identifier, and one or more destination identifiers, such as internet protocol (IP) addresses of different devices. Other embodiments of the notification may include more or fewer features. An example notification may comprise an application identifier and account identifier in the header without including an identifier of a notification type, urgency, or recipient devices.

At step 204, notification server 106 detects statuses of devices associated with an account identifier of the notification 104. For example, notification server 106 may access stored application data, such as data stored in storage 1008 of FIG. 10, that includes account identifiers and device identifiers. Using the stored data, the notification server 106 may identify a plurality of device identifiers that correspond to an account identifier of the notification. The notification server 106 may then send a request to the user devices 108 to provide status information. Upon receipt of the status information from the plurality of devices, the notification server 106 may select a device based on the device statuses, as described further herein.

At step 206, after selecting a device based on the device statuses, notification server 106 appends a device identifier to the notification. For example, the server computer may append the device identifier to a "destination" portion of the notification header, thereby causing the notification to be transmitted to the device with the device identifier. The device identifier may be a device identifier generated by the notification server 106 and/or a destination address, such as an internet protocol (IP) address of the device.

At step 208, the notification server routes the notification to a selected device. For example, I/O path 1002 of the notification server may transmit the notification to the device with the device identifier that was appended to the notification. The notification server may transmit the notification upon identifying the recipient device and/or store the notification with the device identifier and transmit the notification when a request is received from a device with the device identifier.

Figure 3:
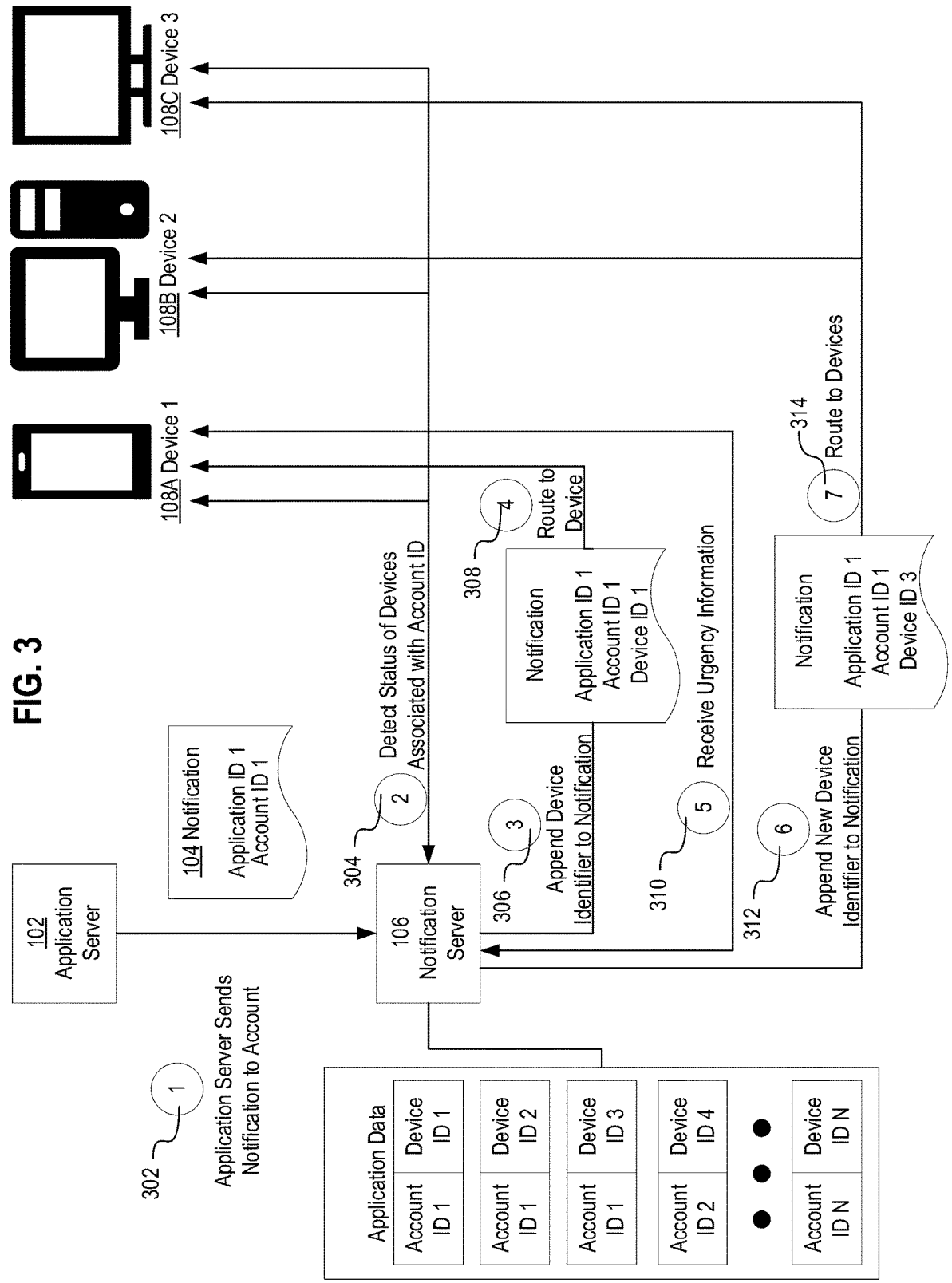
FIG. 3 depicts an example method for dynamically routing notifications with additional routing based on an urgency of a message, in accordance with some embodiments of the disclosure.
Figure 4:
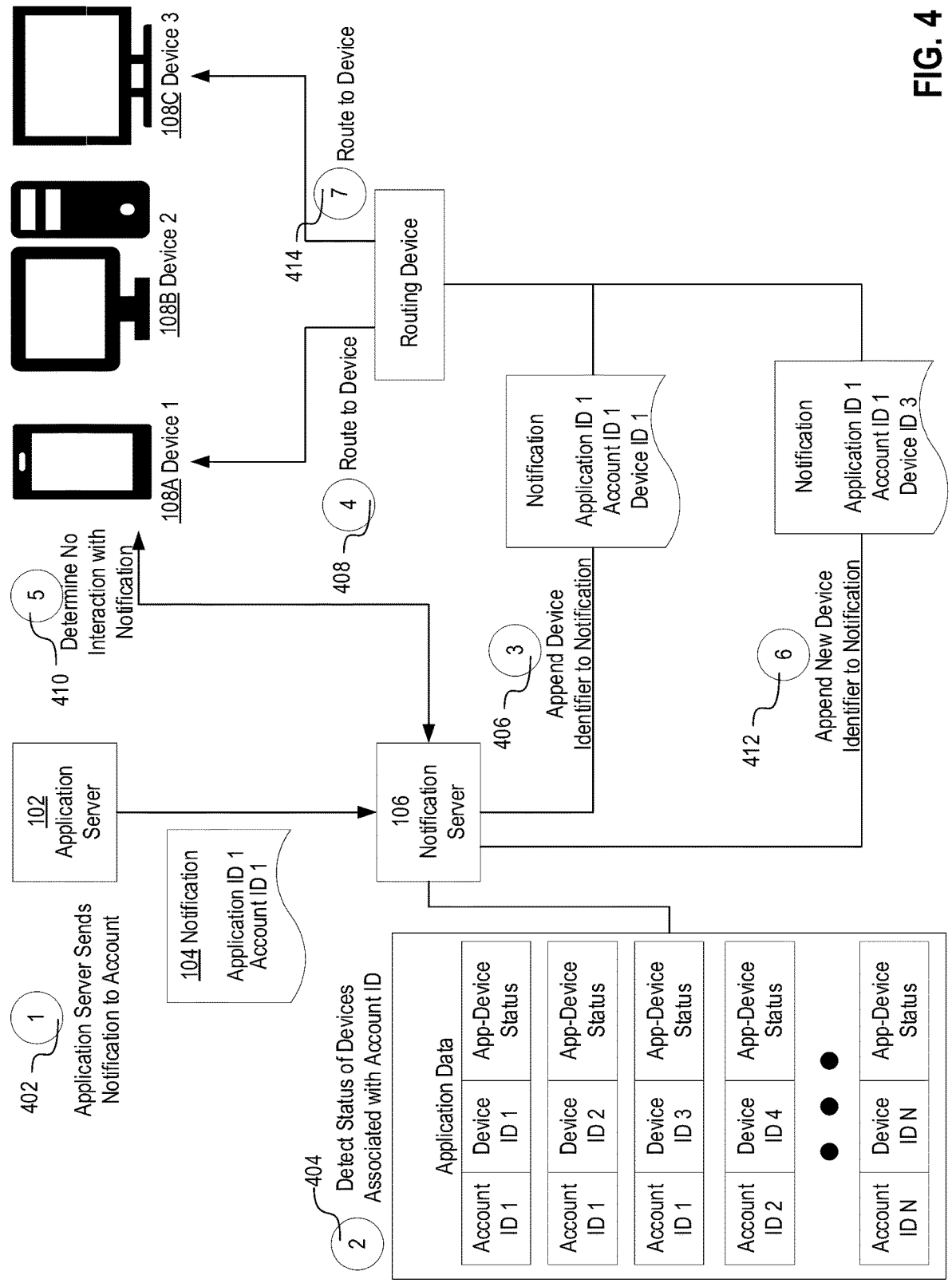
FIG. 4 depicts an example method for dynamically routing notifications using a routing device, in accordance with some embodiments of the disclosure.

At step 210, the notification server determines that no interaction with the notification occurred at device 108A. For example, the user input interface 1010 may request data from the client device indicating whether the notification was accessed, viewed, or dismissed. If the notification server does not receive a response from the client device and/or receives a response that indicates that the notification was not accessed, viewed, or dismissed, the notification server may determine that no interaction with the notification occurred at the device. While FIGS. 2-4 depict steps of rerouting the notification to a second device, in some embodiments, the method ends when the notification is initially routed to a device.

In an embodiment, when the notification server determines that no interaction with the notification occurred at the device 108A, the notification server selects a second device of the plurality of devices to receive the notification. As described herein, the notification server 106 may select the second device in response to determining that no interaction occurred after a threshold period of time, either by waiting the threshold period of time to request data indicating whether an interaction with the notification occurred at the device 108A or determining, after receiving a response to the request, whether the threshold period of time has passed and performing the selecting of the second device in response to determining that the threshold period of time has passed.

The threshold period of time may be a predetermined period of time based on when the notification was sent and/or received by the user device, such as five minutes.

At step 212, after selecting a second device, the notification server appends a new device identifier to the notification. For example, the server computer may update the "destination" portion of the notification header to include the device identifier for the second device, thereby causing the notification to be transmitted to the second device. The device identifier may be a device identifier generated by the notification server 106 and/or a destination address, such as an internet protocol (IP) address of the device.

At step 214, the notification server routes the notification to the selected second device. For example, I/O path 1002 of the notification server may transmit the notification to the second device based on the updated device identifier in the header of the notification. The notification server may transmit the notification upon identifying the recipient device and/or store the notification with the device identifier and transmit the notification when a request is received from a device with the device identifier.

FIG. 3 depicts an example method for dynamically routing notifications with additional routing based on an urgency of a message. The method of FIG. 3 differs from the method of FIG. 2 in that an urgency determination is used to determine whether to route the notification to a second device. In an embodiment, the implementation of FIG. 3 is combined with the implementation of FIG. 2. For example, the notification server may be configured to perform the second routing based on both the urgency of the notification and the absence of an interaction with the notification.

At step 302, the application server 102 transmits a notification 104 that is directed to a user account. For example, the application server 102 may send data comprising a notification header and notification payload to the notification server 106. The application server 102 may transmit the notification in response to requests for notifications that correspond to a specific account identifier, in response to generating the notification, and/or periodically. The notification is considered "directed to" a user account if stored data, such as data stored in storage 1008 of FIG. 10, indicates that the notification is to be displayed on client devices that are signed in to the user account. The "directed to" component of the notification may be satisfied by a stored account identifier being stored in association with the notification, such that the notification is routed to devices that execute the application and are signed in to the client account.

At step 304, notification server 106 detects a status of devices associated with an account identifier of the notification 104. For example, notification server 106 may access stored application data, such as data stored in storage 1008 of FIG. 10, which includes account identifiers and device identifiers. Using the stored data, the notification server 106 may identify a plurality of device identifiers that correspond to an account identifier of the notification. The notification server 106 may then send a request to the user devices 108 to provide status information. Upon receipt of the status information from the plurality of devices, the notification server 106 may select a device based on the device statuses, as described further herein.

At step 306, after selecting a device based on the device statuses, notification server 106 appends a device identifier to the notification. For example, the server computer may append the device identifier to a "destination" portion of the notification header, thereby causing the notification to be transmitted to the device with the device identifier. The device identifier may be a device identifier generated by the notification server 106 and/or a destination address, such as an internet protocol (IP) address of the device.

At step 308, the notification server routes the notification to a selected device. For example, I/O path 1002 of the notification server may transmit the notification to the device with the device identifier that was appended to the notification. The notification server may transmit the notification upon identifying the recipient device and/or store the notification with the device identifier and transmit the notification when a request is received from a device with the device identifier.

At step 310, the notification server receives urgency information. The urgency information, as used herein, refers to information identifying an urgency of the notification and/or information that is used by the notification server to determine the urgency of the notification. As an example, the application server may send, with the notification, an indication if the notification is considered to have "high," "medium," or "low" urgency. As another example, the application server may send the notification with an identifier of a type of notification. The notification server may store data, such as in storage 1008 of FIG. 10, identifying types of notifications and corresponding urgency levels. For instance, an unfamiliar device sign-on notification may be identified in the stored data as having a high urgency while a new show recommendation may be identified in the stored data as having a low urgency.

In an embodiment, the urgency determination is performed through an analysis of the contents of the notification. For example, the notification server may perform a keyword analysis using general linguistic analysis techniques to determine an urgency of the notification. Additionally or alternatively, the client device that receives the notification may perform a linguistic analysis on the contents of the notification to determine an urgency of the notification and send the urgency information back to the notification server. In this manner, the privacy of the notification is protected as only the client device reviews the contents of the notification.

In an embodiment, the notification server determines if the urgency of the notification is greater than a threshold value. For example, the notification server may determine if the notification has a "high" urgency or an urgency score that is greater than a preset value. If so, the notification server selects a second device of the plurality of devices to receive the notification. In an embodiment, the notification server additionally determines if a threshold period of time has passed without an interaction with the notification having occurred, such as is described in FIG. 2. In response to determining that the urgency is greater than a threshold value and greater than the threshold period of time has passed, the notification server may select the second device to receive the notification. Additionally or alternatively, the urgency of the notification may be used to determine the threshold period of time and/or decrease an existing threshold period of time. For example, a notification with a "high" urgency may correspond to a threshold period of time of one minute while a notification with a "low" urgency corresponds to a threshold period of time of thirty minutes. Additionally or alternatively, the urgency of the notification may be used to determine which device should next receive the notification. For example, if the message has a "high" urgency, the system may prioritize devices that are proximate to the user, such as a mobile device or smartwatch, while if the message has a "low" urgency, the system may prioritize devices that are optimal for performing an action corresponding to the notification, such as playing a television show.

While FIG. 2 and FIG. 3 depict the second notification being sent to a single device, in other embodiments the second notification is sent to a plurality of devices. For example, the notification server may be configured to send the notifications to all of the remaining devices in response to determining that the threshold time period has passed without an interaction with the notification, that an urgency of the notification is greater than a threshold value, or a combination of the two. In this manner, the notification server balances the benefits of reducing the number of notifications delivered to devices with the benefits of ensuring that a notification is received and viewed.

At step 312, after selecting a second device, the notification server appends a new device identifier to the notification. For example, the server computer may update the "destination" portion of the notification header to include the device identifier for the second device, thereby causing the notification to be transmitted to the second device. The device identifier may be a device identifier generated by the notification server 106 and/or a destination address, such as an internet protocol (IP) address of the device.

At step 314, the notification server routes the notification to the selected second device or devices. For example, I/O path 1002 of the notification server may transmit the notification to the second device based on the updated device identifier in the header of the notification. The notification server may transmit the notification upon identifying the recipient device and/or store the notification with the device identifier and transmit the notification when a request is received from a device with the device identifier.

FIG. 4 depicts an example method for dynamically routing notifications using a routing device. The method of FIG. 4 differs from the method of FIG. 2 in two ways. First, the stored application data includes device statuses. Second, a routing device separate from the notification server performs the routing of the notifications. The routing device may comprise a separate computing device configured to receive notifications with device identifiers and route the notifications to the device identifiers. In embodiments where the application server performs the functions of the notification server, the application server may perform the determining of the device to which to route the notification and send the notification to the routing device with the device identifier. These routing device and the stored application device statuses may be used in combination, as depicted in FIG. 4, or separately. For instance, an embodiment may comprise stored application device statuses used by the notification server without notifications being routed through the routing device.

At step 402, the application server 102 transmits a notification 104 that is directed to a user account. For example, the application server 102 may send data comprising a notification header and notification payload to the notification server 106. The application server 102 may transmit the notification in response to requests for notifications that correspond to a specific account identifier, in response to generating the notification, and/or periodically. The notification is considered "directed to" a user account if stored data, such as data stored in storage 1008 of FIG. 10, indicates that the notification is to be displayed on client devices that are signed in to the user account. The "directed to" component of the notification may be satisfied by a stored account identifier being stored in association with the notification, such that the notification is routed to devices that execute the application and are signed in to the client account.

At step 404, notification server 106 detects a status of devices associated with an account identifier of the notification 104. For example, notification server 106 may access stored application data, such as data stored in storage 1008 of FIG. 10, that includes account identifiers and device identifiers. The stored data may additionally include application device statuses. The application device statuses, as used herein, refer to status information that is relevant to the application, the application server, and/or one or more rules used to determine where to route notifications. For instance, rules for a first application may be based on device health while rules for a second application may be based on historical usage data. Thus, the application device status for the first application may include device health information while the application device status for the second application may include historical usage data. In an embodiment, the devices are configured to send application device statuses periodically to the notification server and/or in response to detecting a change to the device statuses. Additionally or alternatively, the notification server may be configured to request new device statuses from the devices periodically to update the stored application data. The notification server 106 may select a device to receive the notification based on the device statuses, as described further herein.

At step 406, after selecting a device based on the device statuses, notification server 106 appends a device identifier to the notification and transmits the notification to a routing device. For example, the server computer may append the device identifier to a "destination" portion of the notification header. Additionally or alternatively, the server computer may append the device identifier as separate metadata in a location that the routing device is configured to identify as the destination of the notification, such as a destination location in a JavaScript Object Notation (JSON) dictionary that includes or is included with the notification. The device identifier may be a device identifier generated by the notification server 106 and/or a destination address, such as an internet protocol (IP) address of the device.

At step 408, the routing device routes the notification to a selected device. For example, the routing device may transmit the notification to the device with the device identifier that was appended to the notification. The routing device may route the notification upon receiving the notification from the notification server and/or store the notification with the device identifier and transmit the notification when a request is received from a device with the device identifier.

At step 410, the notification server determines that no interaction with the notification occurred at device 108A. For example, user input interface 1010 of the notification server may request data from the client device indicating whether the notification was accessed, viewed, or dismissed. If the notification server does not receive a response from the client device and/or receives a response that indicates that the notification was not accessed, viewed, or dismissed, the notification server may determine that no interaction with the notification occurred at the device.

In an embodiment, when the notification server determines that no interaction with the notification occurred at the device 108A, the notification server selects a second device of the plurality of devices to receive the notification. As described herein, the notification server 106 may select the second device in response to determining that no interaction occurred after a threshold period of time, either by waiting the threshold period of time to request data indicating whether an interaction with the notification occurred at the device 108A or determining, after receiving a response to the request, whether the threshold period of time has passed and performing the selecting of the second device in response to determining that the threshold period of time has passed. The threshold period of time may be a predetermined period of time based on when the notification was sent and/or received by the user device, such as five minutes.

At step 412, after selecting a second device, the notification server appends a new device identifier to the notification and routes the notification to the routing device. For example, the server computer may update the "destination" portion of the notification header to include the device identifier for the second device or update the metadata with the second device identifier. The device identifier may be a device identifier generated by the notification server 106 and/or a destination address, such as an internet protocol (IP) address of the device. The notification server transmits the notification to the routing device.

At step 414, the routing device routes the notification to the selected second device. For example, the routing device may transmit the notification to the device with the device identifier that was appended to the notification. The routing device may route the notification upon receiving the notification from the notification server and/or store the notification with the device identifier and transmit the notification when a request is received from a device with the device identifier.

Device Determination Based on Device Statuses

In an embodiment, a device is selected based on the device statuses for each of the plurality of devices. For example, the control circuitry 1004 of the notification server may identify stored device data, such as data stored in storage 1008 of FIG. 10, that indicates a then-current or most recent status of the plurality of devices. The plurality of devices may be configured to periodically send updates to the notification server or send updates to the notification server in response to a change in status. For example, if a device changes a network connection, the device may send an update to the notification server indicating the new connection type. Additionally or alternatively, the notification server may send a request to the client devices for a then-current status of the devices.

The status of the devices may include any status information that the system receives from the client device. The status information may include information relating to a single status type for each device, information relating to multiple status types for each device, and/or information relating to different status types for each device. The determination of where to route the notification may be based solely on status information, based on status information and notification information, based on status information and device types, and/or based on application and/or device specific rules with respect to the status information. The status may include one or more of a determined proximity of the device to a user of the device, device settings that affect alerts, device health information, information relating to when the device was last used, user preference information relating to the application, or network information. Each of the above examples will be discussed in detail below.

The proximity of the device to the user may comprise a determined distance of the user from the device. The distance may be determined using any of a plurality of methods. For example, the plurality of devices may comprise one or more proximity sensors or cameras that are configured to detect movement. The sensors may relay information to the device indicating a last detected movement and/or a time of a last detected movement. Proximity information may additionally or alternatively be identified through previous interactions with devices. For example, if a user recently unlocked or provided input into a mobile phone, the mobile phone may determine that the user is proximate to the mobile phone. Proximity information may additionally be determined by a proximity of multiple devices to one another. For example, a smartwatch may detect that it is being worn through heat sensors. The smartwatch may additionally have a Bluetooth connection to one or more other devices, such as a mobile phone. The mobile phone may be determined to be proximate to the user based on a distance between the mobile phone and the smartwatch when the smartwatch is being worn.

Proximity information may be a binary determination and/or a distance or time computation. An example of a binary interpretation may include determining that the device is proximate to the user if the device is detected as being worn by the user through sensors on the device or is determined to be connected by Bluetooth to a device being worn by the user. An example of a distance computation may include using one or more sensors to determine a distance from the user to the device and/or a distance from the device to a second device determined to be proximate to a user, such as a worn device or a device that was activated or used recently. An example of a time computation may include a determination of an amount of time since the device last received input or was otherwise used. For instance, a device displaying a movie may not receive input, but would still be considered as being used.

Proximity information may be used on its own or in combination with other device status information to select the device to receive the notification. For example, the system may select the device that is closest to the user based on proximity information for the plurality of devices. As another example, the system may select a device based on other status information and/or stored priority information, such as data stored in storage 1008 of FIG. 10, and override the selection based on proximity information. For instance, the system may be configured to prioritize a television for receiving a notification as long as the television is determined to be proximate to a user and/or within a threshold proximity of the user.

The device settings that affect alerts may include general notification settings for the device and/or application-specific notifications. For example, a device may have a "Do not disturb" setting which causes received notifications to not be displayed when the device is in a locked state or a "movie/gaming" setting that causes received notifications to not be displayed when the device is displaying a movie or game. As another example, the device may store application settings for the application for which the notification is being sent that exclude display of notifications and/or notifications of a particular type. Other device settings that affect notifications may include whether the device is powered on, whether the device is connected to a network, whether a display of the device is on, whether audio for the device has been enabled or disabled, whether other alert avenues, such as vibrate on a mobile device, have been enabled or disabled, or whether the device is displaying an application that excludes the display of other notifications.

Device settings that affect alerts may be used on their own or in combination with other device status information to select the device to receive the notification. For example, the system may filter the plurality of devices down to only the devices that do not currently have a device setting that negatively affects alerts. The system may then select from the remaining devices based on stored priority information related to the devices or application. As another example, the system may select a device based on other device status information and override that selection if the device has a setting that affects alerts. Alternatively, the system may determine a priority for each device based on other status information and send the notification to the device with the highest priority that does not have a device setting that affects alerts.

In an embodiment, the system makes dynamic determinations based on device settings. For example, the system may determine that the device currently has a device setting that affects alerts, but the system may determine that the device is likely to change that setting in the near future. For example, if the device is usually on "Do not disturb" mode until 6:00 am and the notification is received at 5:30 am, the system may determine, based on historical device settings, that the system is likely to not be on "Do not disturb" mode in thirty minutes and still route the notification to the device. Embodiments of tracking device settings may include storing start times and end times of different device settings. The system may then use the stored start times and end times to compute probabilities, for different time slots and/or different days of the week, that the device will have a particular setting, such as by dividing a total amount of time during the time slot and/or day of the week that the device had the particular setting by a total amount of time in the tracked time slots and/or days of the week.

The device health information may include a hardware or software status of the device that affects notifications. For example, if the device detects that it has a damaged screen, the system may receive device health information indicating that the device has a broken screen. As another example, the system may receive battery information for the devices to determine a likely effect of sending the notification to the device.

Device health information may be used on its own or in combination with other device status information to select the device to receive the notification. For example, the system may filter out devices that have specific negative health parameters, such as low battery or broken screen. In an embodiment, the system may select a device based on the health information and information relating to the notification. For example, if the notification is for an application that highly affects battery life, the system may store a battery life threshold for a device, such as data stored in storage 1008 of FIG. 10. If the device has a battery life lower than the threshold, the system may be configured to not route the notification to the device.

Information relating to when the device was last used may comprise data that indicates a time when input was last received at the device and/or when the device last displayed media through an application. As an example, a television that is currently playing a television program may be considered to be currently being used. Alternatively, a computer that is on but has not changed its display or received input in the last hour may be considered to have last been used over an hour ago.

Information relating to when the device was last used may be used on its own or in combination with other device status information to select the device to receive the notification. For example, the system may select a most recently used device to send the notification to. As another example, the system may determine that devices have been used within a threshold period of time and select a device from the group of devices which have been used within a threshold period of time based on proximity information.

User preference information relating to the application may include defined user preferences for the application corresponding to the notification. For example, an application executing on a user device may provide options for selecting a device on which the user prefers to use the application and/or receive notifications. In an embodiment, user preferences are determined based on historical usage information. The historical usage information may be used at the plurality of devices to determine a device preference of the user, which is then conveyed to the system. Additionally or alternatively, the historical usage information may be sent directly to the system, which uses the historical usage information to determine to which device to send the notification.

Historical usage information may include application usage information and/or notification response information. Application usage information may be determined based on an amount of time the application is executing on each device, an amount of time the application is actively receiving input on each device, a number of times the application is opened on each device, an amount of time the application is being displayed on the device, and/or any other metric for determining a quantitative value for application usage. Notification response information may be determined based on a number of notifications for the application that were viewed on the device, a number of times a notification for the application was first viewed on the device, a number of times a notification was selected on the device, and/or a number of times the notification was dismissed or ignored on the device.

Historical usage information may be single values, such as a quantitative measure for a particular time window, such as a "past 7 days" time window. The time window may be a moving time window measured based on a current time or a periodic time window, such as covering a Monday-Sunday schedule. Additionally or alternatively, the historical usage information may be time-series data indicating, for each block of time of application usage, a time of usage, such as a start time or stop time, and a length of usage, such as ten minutes. The time-series data allows the system or the device to make a determination about application usage that is specific to a time of day or week. For example, the system may determine application preferences based on highest historical usage for specific blocks of time during the day, for specific days, and/or for specific blocks of time on specific days. By tracking historical usage for different blocks of time during a day, for different days, or for different blocks of times on different days, the system is able to determine time-specific device preferences. The notification server may identify time-specific device preferences for a time window that matches a then-current time window, i.e. the then-current time window covers a same period of time in a day and/or a same day of the week as the matching time window, and base the selection of the device on the historical usage information for that time window. For instance, a user may only watch television after 5:00 μm and on the weekends. Thus, an application executing on the television may be used more than the same application executing on a mobile device on weekdays after 5:00 μm and on weekends. Where a determination of average historical usage may cause the system to always send the notification to the same device, a determination of historical usage for each hour/day combination would cause the system to route the notification to the mobile device before 5:00 pm on a weekday and to the television after 5 pm on a weekday.

User preference information may be used on its own or in combination with other device status information to select the device to receive the notification. For example, the system may select the device which has the highest historical application usage or highest historical notification response. As another example, the system may determine which device has the highest historical usage and then determine if the device has been used within the last hour. If the device has not been used in the last hour, the system may select the next device in the list with the highest historical usage and make the same determination.

In an embodiment, the system sends the notification to the device with the highest notification responses even if a different device has the highest application usage. For example, historical usage information may indicate that a user uses an email application on a computer more than on a mobile device, but reviews notifications on the mobile device more often than the computer. The system may select the mobile device to receive the notification. Additionally or alternatively, the system may be configured to make more nuanced determinations based on historical application usage and notification responses. For example, the system may send the notification to the device with the highest historical application usage unless a difference in notification responses between devices exceeds a threshold value.

Network information may include a signal strength, a type of network to which the device is connected, and/or user settings relating to a type of network to which the device is connected. For example, the system may determine whether the device is connected to a home network or a work network. As another example, the system may determine whether the device is connected through WiFi or through a cable connection. As a further example, the system may determine whether the device is connected to a WiFi network or a cellular network. The settings relating to the type of network to which the device is connected may include settings that block large downloads when the device is connected to a cellular network or settings that reduce video quality when signal quality is below a threshold value.

Network information may be used on its own or in combination with other device status information to select the device to receive the notification. For example, the system may be configured to send a notification to a mobile device when the mobile device is connected to a cellular network, as the connection to the cellular network indicates that the user is not at home. As another example, the system may select a plurality of devices connected to a home network to receive a notification relating to a download and select the device with the highest historical usage to receive the notification.

In an embodiment, the system computes a priority score for each of the plurality of devices based on device status information. Device status information used to compute the priority score may include any of a determined proximity of the device to a user of the device, device settings that affect alerts, device health information, information relating to when the device was last used, user preference information relating to the application, or network information. The device statuses described herein may be used to generate status values, which are then weighted to compute the score. Additionally or alternatively, each of the factors may be normalized to a particular range of values, which are then added to each other. As a practical example, values may be determined as follows:

| | |
|---|---|
| Proximity Value | (if prox==true, 10; if prox==false, 0) |
| Alert Settings Value | (if alert==none, 0; if alert ==mitigated, 5; if alert==allowed, 10) |
| Device Health Value | (current battery/total battery) × 10 |
| Last Used | (if <1 minute, 20; if >1 minute, less than 10 minutes, 5; if >5 minutes; 0) |
| Preference | (app usage on device/total app usage) × 20 + (notification response on device/total notification response) × 30 |
| Network | (if network==mobile, 10; if network==home, 0) |

The system determines the score of each above factor and then combines these scores to calculate a priority score. The system may then select the device that has the highest priority score to receive the notification. In an embodiment, if the notification is not viewed or dismissed within a threshold period of time and/or if a determined urgency of the notification is greater than a threshold value, the system may select the device with the next-highest priority score and send the notification to the selected device.

The above table comprises one example method for generating a score from the listed factors. A score may be generated from all of the above factors or any of a subset of the above factors using the methods described herein. Additionally or alternatively, the score may be generated based on some factors but overwritten based on others. For example, a priority score may be based on preferences, network settings, and proximity values, but the device with the highest score may be excluded from receiving the notification if the battery of the device is at less than 10%.

A priority score for each device may be computed each time and/or updated over time based on one or more factors. For example, a first set of device priority scores may be computed using the methods described herein. If a notification is viewed on the device to which it was sent, the system may increase the priority score for that device. If the application was executed on a different device, thereby dismissing the notification on the device to which the notification was sent, the system may decrease the priority score for the device that received the notification and increase the priority score for the device that did not receive the notification.

In an embodiment, device status information may be used to override a priority score. For example, the priority score may be computed as described above and/or with a subset of the factors described above. The notification server may additionally determine a parameter of a device status for the device with the highest priority score and, based on the parameter, may not select the device with the highest priority score, but instead evaluate the device with the next-highest priority score. Practical examples of overrides of priority scores include: if the device has a health status below a threshold value, such as a battery life that is below a threshold value; if the device has a device setting that affects notifications, such as having notifications muted or turned off; if the device has not been used in greater than a threshold period of time, such as one hour; or if the device is determined to not be proximate to the user using any of the methods described herein.

In an embodiment, a method for determining to which device to send the notification is based, at least in part, on information relating to the notification. For example notifications of different types for a same application may correspond to different rules stored by the system, such as in storage 1008 of FIG. 10. The system may determine a type of notification, such as through metadata of the notification that identifies a notification type or through analysis of the contents of the notification, and apply a set of rules corresponding to the notification type. For example, a first type of notification for a streaming application may identify new episodes of a show that are available. The rules for selecting the device to receive the notification may include rules based on streaming application usage for each device. A second type of notification for the streaming application may include a warning of a login on an unknown device. The rules for selecting the device to receive the second type of notification may be based on proximity to device and/or which device was last used. In this manner, the optimal routing of notifications may be dynamic to the type of notification being sent.

In an embodiment, the information relating to the notification comprises an indication of an action to be performed in response to the notification. For example, a notification may identify a new episode of a show has come out. The system may identify that the action to be performed in selecting the notification is watching the show. The system may then filter out devices, such as smartwatches, that are not capable of playing the show. The system may then select from the remaining devices. Similarly, if a verification action is required, the system may filter for only devices that are capable of performing the verification. The system may additionally reformat the notification to match the device to which the notification was sent.

In an embodiment, contents of the notification are manipulated and/or changed based on which device is selected. For example, the notification may indicate how the device can respond to the notification and/or identify other devices that can respond to the notification. Additionally or alternatively, the system may receive different versions of the notification for different devices. When a device is selected, the system may select the notification corresponding to a device type of the selected device and send the selected notification to the selected device.

In an embodiment, the notification is modified to include one or more options for launching the application corresponding to the notification on a different device. For example, if a notification relating to a new episode of a show is received, but the television where the show is generally watched is not on, the notification may be routed to the user device with an option that, when selected, causes the television to turn on and execute the application corresponding to the notification. In an embodiment, the device or devices selected for the option to launch the application are selected using the methods described herein. For example, the system may compute priority scores for a plurality of different devices. When the notification is sent to a device, such as a mobile device, the system may select the device with the highest priority score and generate an option to launch the application on the device with the highest priority score. Additionally or alternatively, the notification may identify a plurality of devices through which to launch the application and order the devices based on priority scores.

In an embodiment, a method for determining to which device to send the notification is based, at least in part, on the application to which the notification corresponds. For example, the system may route notifications for different applications. The system may store data identifying rules and corresponding application identifiers. When the system receives a notification, the system may identify an application identifier and apply the corresponding rule to select the device to which the notification will be sent.

Exemplary Embodiments

Figure 5:
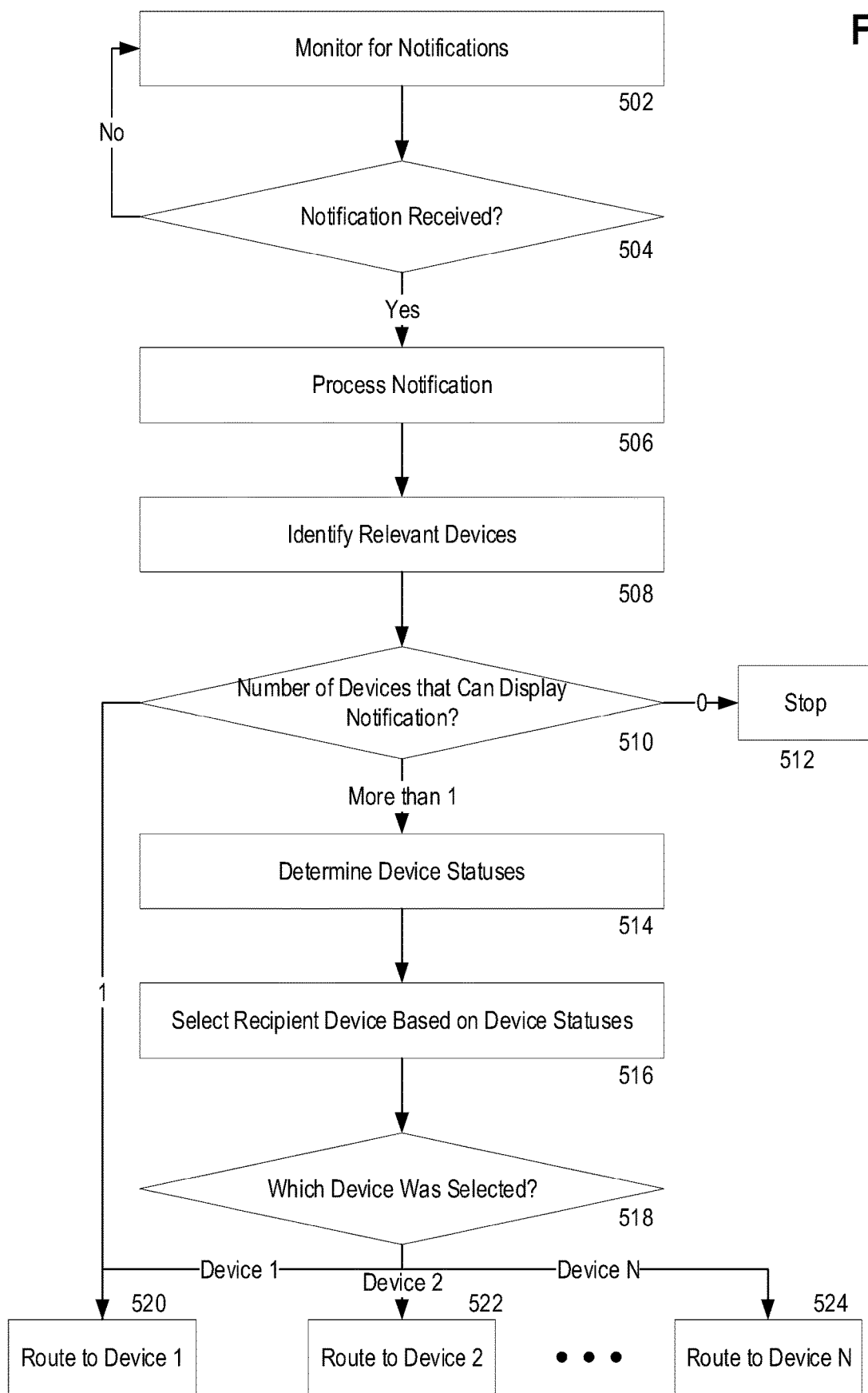
FIG. 5 depicts an example method for dynamically routing application notifications, in accordance with some embodiments of the disclosure.

FIG. 5 depicts an example method for dynamically routing application notifications. It should be noted that the processes of FIGS. 5-9 may be performed by control circuitry 1004 of FIG. 10 as instructed by a device that is communicatively coupled to any devices 1502, 1504, 1506 of FIG. 15. In addition, one or more steps of the process may be incorporated into or combined with one or more steps of any other process or embodiment (e.g., the processes of FIG. 6 or FIG. 7). The process of FIGS. 5-9 may be performed in accordance with the embodiments discussed in connection with FIGS. 1-4. While FIG. 5-9 depict a particular order for the purpose of providing a clear example, the steps of the methods of FIGS. 5-9 may be performed in different orders, as would be understood by one of skill in the art. For example, step 616 of FIG. 6 may be performed prior to step 602, with the notification server initially selecting a first device to receive the notification and a second device to receive the notification if the first device does not interact with the notification within a threshold period of time.

At block 502, the I/O path 1002 monitors for new notifications. For example, a process thread executed by I/O path 1002 on the notification server may be configured to listen for new notifications received by the notification server. The process thread may review incoming communications of the notification server and identify each notification that is received.

At block 504, the I/O path 1002 determines if a new notification has been received. For example, the process thread may monitor the incoming communications and make a determination as to whether any of the incoming communications comprises a notification. If a notification has not been received, the method returns to block 502 and the I/O path 1002 continues to monitor for new notifications.

If a new notification has been received, at block 506, then the control circuitry 1004 processes the notification. For example, the notification server may be configured to extract relevant data from the notification, such as an application identifier indicating an application that corresponds to the notification, an account identifier indicating an account to which the notification is directed, and/or other information that may be used to route the notification, such as notification contents, a notification type, urgency data, and/or actions to be performed from the notification.

At block 508, the control circuitry 1004 identifies relevant devices. For example, the notification server may access stored data, such as data stored in storage 1008 of FIG. 10, that identifies each device that corresponds to an account identifier. The data may be stored in a database or other suitable datastore such that the control circuitry 1004 is able to identify, from the stored data, each device that corresponds to a particular account identifier. Additionally or alternatively, the notification may be sent with a plurality of device identifiers identifying each device that is executing the application corresponding to the notification or has the application corresponding to the notification installed on the device.

At block 510, the control circuitry 1004 determines a number of devices that can display the notification. For example, the notification server may identify, from the stored data, a number of devices that correspond to the notification. The notification server may further determine capabilities of the devices, such as whether the device is on or whether the device has muted notifications. If the number is 0, then, at block 512, the process ends. If the number is 1, then, at block 520, the control circuitry 1004 routes the notification to the device that is capable of displaying the notification.

If the number of devices that can display the notification is greater than 1, then, at block 514, the control circuitry 1004 determines one or more device statuses for each of the devices. For example, the notification server may request device statuses from each of the plurality of devices that can display the notification and/or identify device statuses from stored device status information for each of the plurality of devices. In an embodiment, different status types are treated differently, with some being updated periodically and others being updated in response a request generated in response to receiving the notification.

At block 516, the control circuitry 1004 selects a device. For example, the notification server may select a device based on a device status or device statuses for each of the plurality of devices as described previously herein.

At block 518, the control circuitry 1004 determines which device was selected. For example, the notification server may identify a device identifier that corresponds to the device selected at step 516 based on device statuses for the plurality of devices.

At block 520, if device 1 was selected, the I/O path 1002 of the notification server routes the notification to device 1. At block 522, if device 2 was selected, the I/O path 1002 of the notification server routes the notification to device 2. At block 524, if device N was selected, the I/O path 1002 of the notification server routes the notification to device N. For example, the notification server may append a device identifier as a destination address to the notification and transmit the notification over a network to the selected device. In an embodiment, the transmission is performed in response to a request from a device with the matching device identifier for new notifications.

Figure 6:
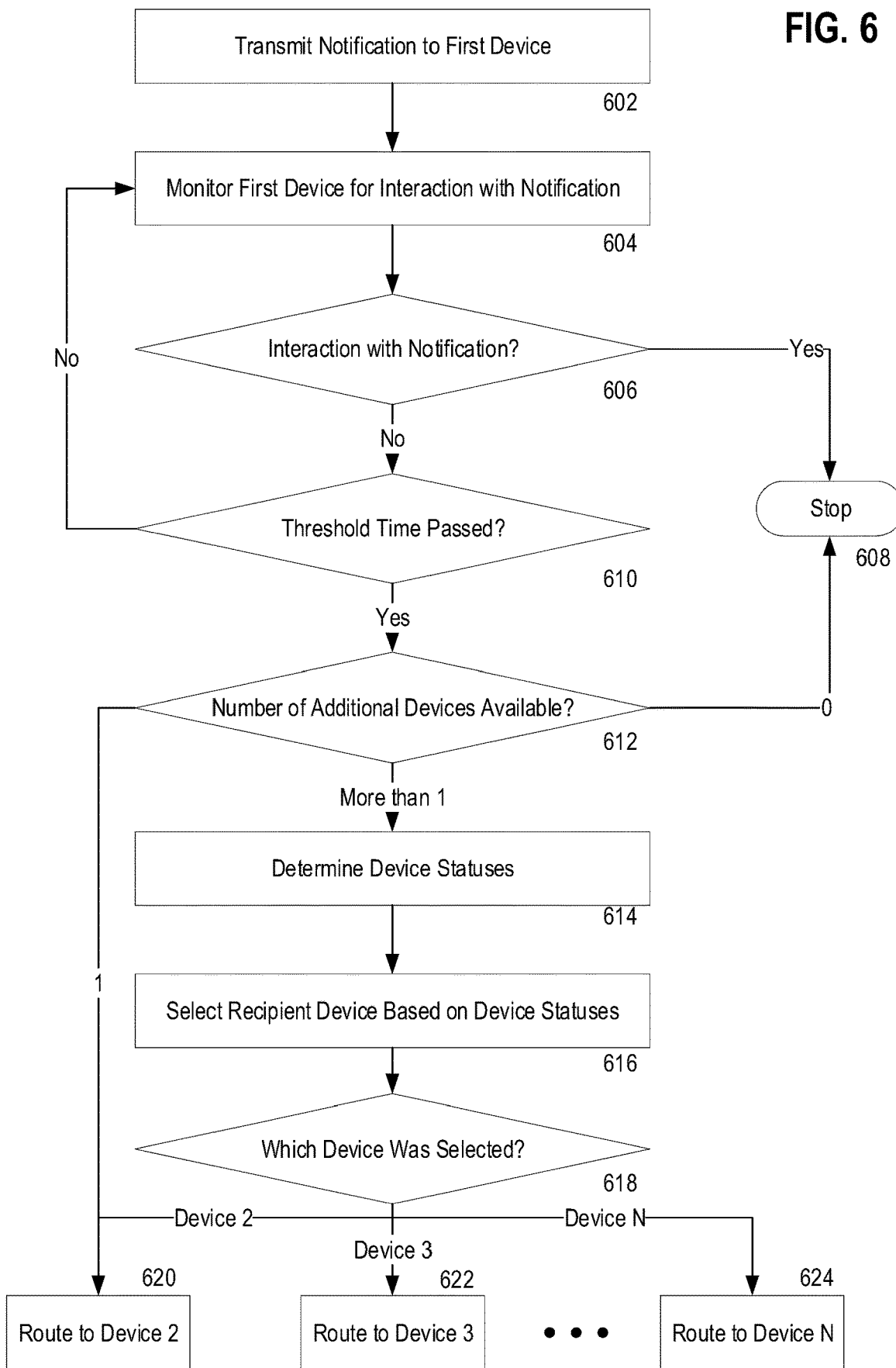
FIG. 6 depicts an example of a method for routing notifications based on different device statuses, in accordance with some embodiments of the disclosure.

FIG. 6 depicts an example method for performing a second routing of notifications. The method of FIG. 6 may be performed after a first device is selected to receive a notification, such as in the process of FIG. 5.

At block 602, I/O path 1002 transmits a notification to a first device. For example, the notification server may select a device to receive a notification based on device statuses as described herein. The notification server may transmit the notification to the first device over a network in response to having selected the device for receiving the notification from among a plurality of devices.

At block 604, the control circuitry 1004 monitors the first device for an interaction with the notification. For example, user input interface 1010 of the notification server may send a request to the client device to send a message to the notification server when an interaction with the notification is performed and/or periodically indicating whether an interaction has occurred or not. Additionally or alternatively, the client device may be configured to update user input interface 1010 of the notification server periodically and/or when an interaction with the notification occurs. The interaction may include any of: user input selecting the notification, user input performing an action of the notification, user input dismissing the notification, and/or user input causing display of the notification. A thread of a process executing on the notification server may be configured to listen for a message from the first device indicating whether an interaction with the notification occurred.

At block 606, the control circuitry 1004 determines whether the first device has interacted with the notification. For example, if the thread receives data from the client device indicating that an interaction occurred, the thread may determine that the first device interacted with the notification. If the thread does not receive a message from the client device and/or receives a message indicating that an interaction has not yet occurred, the thread may determine that the first device has not interacted with the notification.

If the control circuitry 1004 determines that the first device has interacted with the notification, then, at block 608, the process ends. Thus, if the notification was viewed, dismissed, or selected, the notification server may determine that the notification does not need to be rerouted and may cease tracking interactions with the notification.

In an embodiment, instead of initially routing the notification to the first device, the notification server may store the notification with an identifier of the first device, such that the notification may be sent to the first device in response to a request from the first device for a new notification. In this embodiment, step 608 may additionally or alternatively comprise determining whether the first device has sent a request for new notifications. If the first device has not sent a request for notifications, the notification server may determine that the first device has not interacted with the notification.

If the control circuitry 1004 determines that the first device has not interacted with the notification, then, at block 610, the control circuitry 1004 determines if a threshold period of time has passed. The threshold period of time may be a stored threshold period of time that starts from a time the notification was sent by the notification server or received by the client device, such as ten minutes. In an embodiment, the threshold period of time may differ between different applications, different notification types, or different devices that receive the notification. The notification server may access stored data, such as data stored in storage 1008 of FIG. 10, that indicates the threshold period of time for each instance. For example, stored data may indicate that a first threshold period of time applies to all notifications for a first application, a second threshold period of time applies to all notifications of a first type for a second application, a third threshold period of time applies to all notifications of a second type for the second application, a fourth threshold period of time applies to all notifications sent to a device of a first device type for a third application, and a fifth threshold period of time applies to all notifications of a second device type for the third application.

If the threshold period of time has not passed, the method returns to block 604 and the control circuitry 1004 continues to monitor the first device for an interaction with the notification. For example, the process thread may be configured to continue listening for a message from the first device until the threshold period of time has passed or data indicating an interaction with the notification has been received.

If the control circuitry 1004 determines that the threshold period of time has passed, then, at block 612, the control circuitry 1004 determines a number of additional devices that can display the notification. For example, the notification server may determine, from stored data, a number of devices that correspond to the notification, less the first device, which received the notification initially. The notification server may further determine capabilities of the devices, such as whether the device is on or whether the device has muted notifications. If the number is 0, then, at block 608, the process ends. If the number is 1, then, at block 620, the control circuitry 1004 routes the notification to the device that is capable of displaying the notification.

If the number of devices that can display the notification is greater than 1, then, at block 614, the control circuitry 1004 determines one or more device statuses for each of the devices. For example, the notification server may request device statuses from each of the plurality of devices that can display the notification and/or identify device statuses from stored device status information for each of the plurality of devices. Additionally or alternatively, the notification server may reuse device statuses used to initially determine the device to which to route the notification.

At block 616, the control circuitry 1004 selects a device. For example, the notification server may select a device based on device statuses for each of the plurality of devices as described previously herein. Additionally or alternatively, the notification server may initially, prior to sending the notification to the first device, identify an order of priority for the plurality of devices based on device statuses. Thus, the determination of the next device to which the notification is sent may be performed prior to the notification being sent to the first device.

At block 618, the control circuitry 1004 determines which device was selected. For example, the notification server may identify a device identifier that corresponds to the device selected at step 616 based on device statuses for the plurality of devices.

At block 620, if device 1 was selected, the I/O path 1002 routes the notification to device 1. At block 622, if device 2 was selected, the I/O path 1002 routes the notification to device 2. At block 624, if device N was selected, the I/O path 1002 routes the notification to device N. For example, the notification server may append a device identifier as a destination address to the notification and transmit the notification over a network to the selected device. Additionally or alternatively, the notification server may update a destination address previously appended to the notification. In an embodiment, the transmission is performed in response to a request from a device with the matching device identifier for new notifications.

Figure 7:
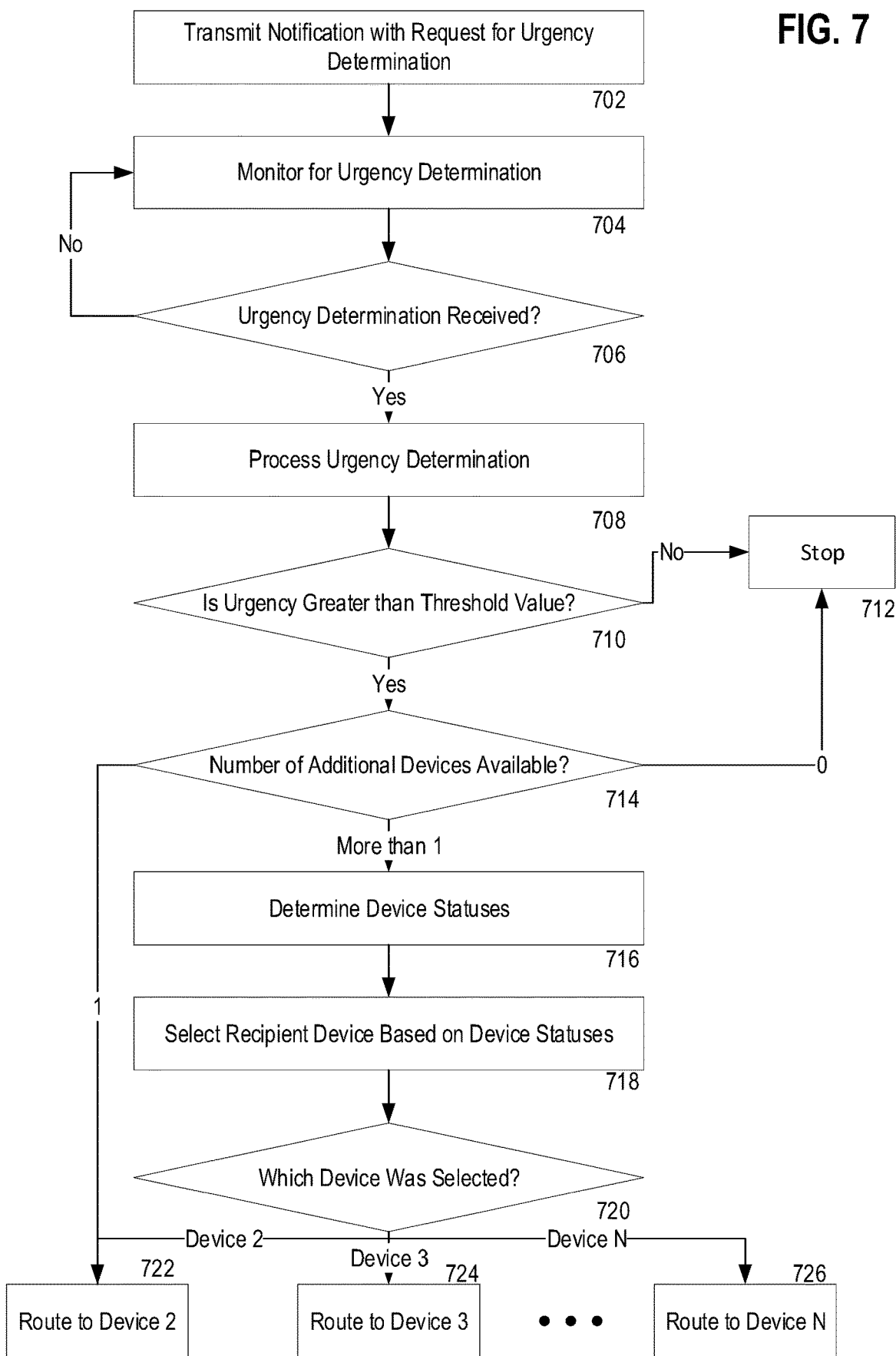
FIG. 7 depicts an example method for performing a second routing of notifications, in accordance with some embodiments of the disclosure.

FIG. 7 depicts an example method for performing a second routing of notifications based on an urgency of a message. The method of FIG. 7 may be performed after a first device is selected to receive a notification, such as in the process of FIG. 5. In an embodiment, the process of FIG. 7 is combined with the process of FIG. 6. For instance, the routing to the second device may be performed in response to both a determination that the threshold period of time has passed and that the urgency is greater than a threshold value. Additionally or alternatively, the threshold period of time of FIG. 6 may be determined based on an urgency of the notification, with a higher urgency value corresponding to a shorter threshold period of time.

At block 702, I/O path 1002 transmits a notification to a first device with a request for an urgency determination. For example, the notification server may select a device to receive a notification based on device statuses as described herein. The notification server may transmit the notification to the first device over a network in response to having selected the device for receiving the notification from among a plurality of devices. User input interface 1010 of the notification server may additionally send a request to the first device to evaluate the notification to determine an urgency of the notification. In an alternative embodiment, the notification server may determine the urgency of the notification prior to sending the notification to the client device, such as through keyword analysis, notification type and stored urgencies corresponding to notification type, and/or received data that indicates the urgency of the notification.

At block 704, the control circuitry 1004 monitors the first device for the urgency determination. For example, a thread of a process executing on the notification server may be configured to listen for a message from the first device indicating an urgency of the notification. The first device may process the notification to determine the urgency of the notification, such as through keyword analysis. By requesting the first device to perform the urgency determination, the notification server is able to route the notification based on the notification's contents without directly accessing the notification's contents, thereby increasing security of the notification. This system is additionally valuable where the notification is encrypted, as the notification server need not have the encryption key to decrypt the notification to determine the notification's urgency. Instead, the first device may decrypt the notification, determine the urgency based on keywords in the notification payload, and send a notification determination to the notification server.

At block 706, the control circuitry 1004 determines whether an urgency determination has been received. For example, if the thread receives data from the client device indicating an urgency of the notification, the thread may determine that the urgency determination has been received. If the thread does not receive a message from the client device, the thread may determine that the urgency determination has not been received. If the control circuitry 1004 determines that the urgency determination has not been received, the method returns to block 704, and the control circuitry 1004 continues to monitor for an urgency determination. For example, the process thread may be configured to continue listening for a message from the first device until the urgency determination is received or a message indicates a denial of the request for the urgency determination.

If the control circuitry 1004 determines that the urgency determination has been received, then, at step 708, the control circuitry 1004 processes the urgency determination. For example, the notification server may determine an urgency value based on the message indicating the urgency of the notification. The urgency value may be a numeric score, such as a value between 0 and 100, or a classifier, such as "high," "medium," or "low".

At step 710, the control circuitry 1004 determines whether the urgency is greater than a threshold value. For example, the notification server may be configured to reroute only the notifications that have an urgency higher than a threshold value. The threshold value may be a numeric score, such as 75, or a classifier, such as "low." If the control circuitry 1004 determines that the urgency is not greater than the threshold value, then, at block 712, the process ends. Thus, if the notification has an urgency lower than or equal to the threshold value, the notification server may determine that the notification does not need to be rerouted.

In an embodiment, the control circuitry 1004 additionally determines if an interaction with the first notification has occurred at the first device, such as is described in reference to FIG. 6. In an embodiment, the control circuitry 1004 is configured to only reroute the notification if no interaction with the first notification has occurred at the first device when the urgency determination is received.

If the control circuitry 1004 determines that the urgency is greater than the threshold value, then, at block 714, the control circuitry 1004 determines a number of additional devices that can display the notification. If the number is 0, then, at block 712, the process ends. If the number is 1, then, at block 722, the control circuitry 1004 routes the notification to the device that is capable of displaying the notification.

If the number of devices that can display the notification is greater than 1, then, at block 716, the control circuitry 1004 determines one or more device statuses for each of the devices. For example, the notification server may request device statuses from each of the plurality of devices that can display the notification and/or identify device statuses from stored device status information for each of the plurality of devices. Additionally or alternatively, the notification server may reuse device statuses used to initially determine the device to which to route the notification.

At block 718, the control circuitry 1004 selects a device. For example, the notification server may select a device based on a device status or device statuses for each of the plurality of devices as described previously herein. Additionally or alternatively, the notification server may initially, prior to sending the notification to the first device, identify an order of priority for the plurality of devices based on device statuses. Thus, the determination of the next device to which the notification is sent may be performed prior to the notification being sent to the first device.

At block 720, the control circuitry 1004 determines which device was selected. For example, the notification server may identify a device identifier that corresponds to the device selected at step 718 based on device statuses for the plurality of devices.

At block 722, if device 1 was selected, the I/O path 1002 routes the notification to device 1. At block 724, if device 2 was selected, the I/O path 1002 routes the notification to device 2. At block 726, if device N was selected, the I/O path 1002 routes the notification to device N. For example, the notification server may append a device identifier as a destination address to the notification and transmit the notification over a network to the selected device. Additionally or alternatively, the notification server may update a destination address previously appended to the notification. In an embodiment, the transmission is performed in response to a request from a device with the matching device identifier for new notifications.

Figure 8:
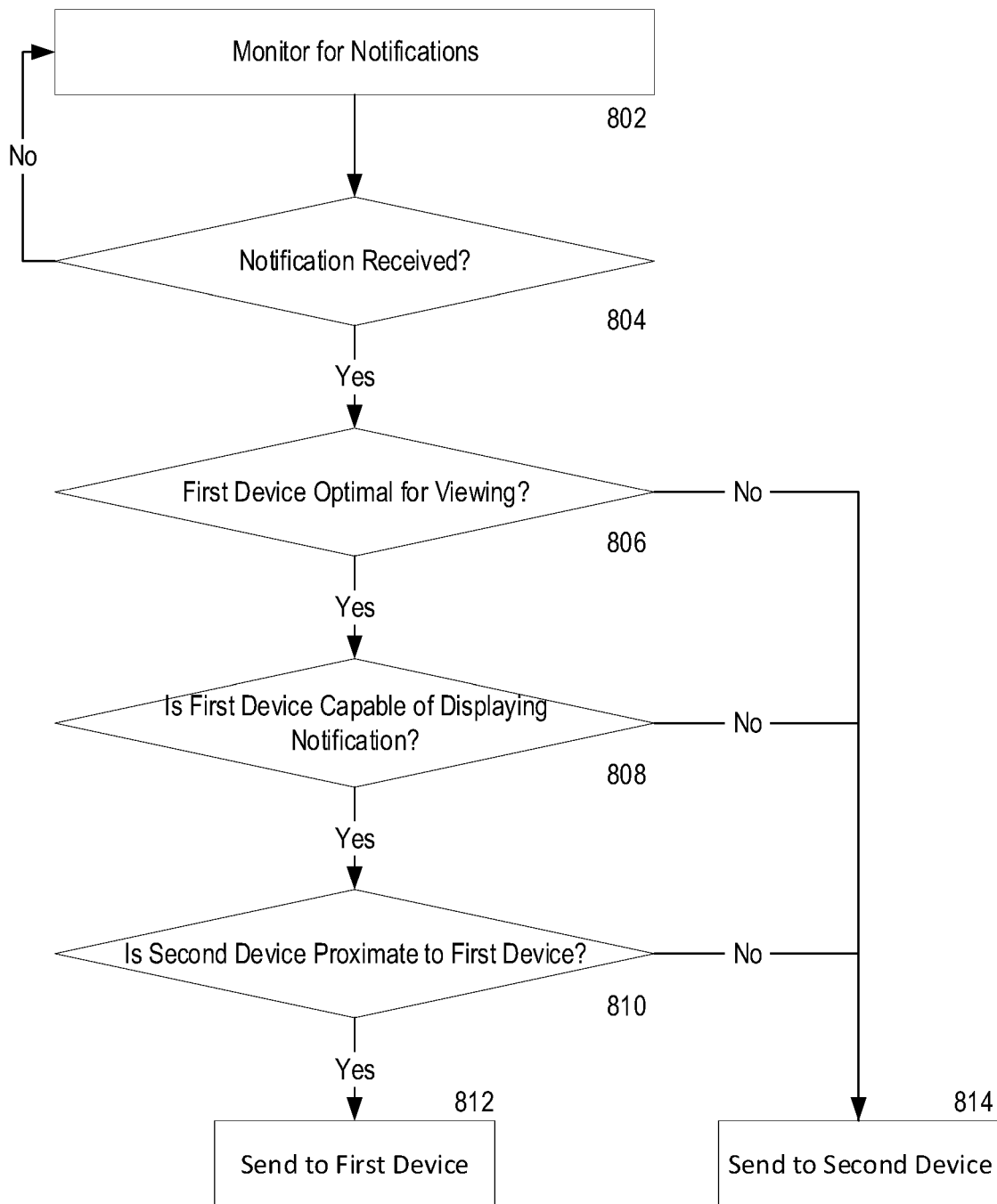
FIG. 8 depicts an example method for performing a second routing of notifications based on an urgency of a message, in accordance with some embodiments of the disclosure.

FIG. 8 depicts an example of a method for routing notifications based on different device statuses. As discussed above, FIG. 8 is intended to provide a practical example, and the order of elements of FIG. 8 may be different in other embodiments. For instance, each of steps 806, 808, and 810 may be performed simultaneously with the results of the determinations accessed as stored data, such as data stored in storage 1008 of FIG. 10. The ordering of steps may additionally vary, with the steps being performed in any order. While the method of FIG. 8 depicts a selection between two devices for the purpose of providing a clear example, other embodiments may use similar features to select between more than two devices. For instance, the notification server may order a plurality of devices based on how optimal the device is for performing the notification and, if either steps 808 or 810 return a "no," the notification server may repeat the steps with the next device listed in the ordered plurality of devices.

At block 802, the I/O path 1002 monitors for new notifications. For example, a process thread executed by I/O path 1002 on the notification server may be configured to listen for new notifications received by the notification server. The process thread may review incoming communications of the notification server and identify each notification that is received.

At block 804, the I/O path 1002 determines if a new notification has been received. For example, the process thread may monitor the incoming communications and make a determination as to whether any of the incoming communications comprises a notification. If a notification has not been received, the method proceeds to block 802, and the I/O path 1002 continues to monitor for new notifications.

If a new notification has been received, then, at block 806, the control circuitry 1004 determines if a first device is optimal for displaying the notification. For example, the notification server may store data, such as in storage 1008 of FIG. 10, indicating optimal devices for notifications based on notification type, notification contents, and/or an action to be performed based on the notification. The notification server may receive data identifying any of the aforementioned elements and/or may determine the aforementioned elements based on an analysis of the notification, such as by identifying links or files in the notification, or performing linguistic analysis of text in the notification. Additionally or alternatively, the notification server may receive, with the notification, data identifying optimal device types for receiving the notification. As a practical example, the notification server may store data indicating that a television is optimal for displaying notifications for new episodes of a television show. If the first device is a television, the notification server may determine, based on the stored data, that the first device is optimal for displaying the notification.

If the control circuitry 1004 determines that the first device is not optimal for viewing the notification, then, at block 814, the control circuitry 1004 transmits the notification to the second device. For example, the second device may have previously been selected as a device to receive notifications based on a device type or other status information. For example, a default device type for notifications may include a mobile phone that is configured to receive notifications if other devices are not selected through other rules. As an alternative, block 814 may comprise executing one or more additional rules to determine a device to which to send the notification that is different from the first and second devices.

If the control circuitry 1004 determines that the first device is optimal for displaying the notification, then, at block 808, the control circuitry 1004 determines if the first device is capable of displaying the notification. For example, the notification server may send a request to the first device for status information which indicates whether the device is capable of displaying the notification. The status information may include whether the device is powered on or whether the device is currently in a mode that blocks display of notifications, such as in a game or movie display mode. If the control circuitry 1004 determines that the first device is not capable of displaying the notification, then, at block 814, the control circuitry 1004 transmits the notification to the second device.

At block 810, the control circuitry 1004 determines if the second device is proximate to the first device. For example, the second device may comprise a mobile device that is assumed to be and/or determined to be proximate to a user. Thus, the status of the second device may comprise a proximity of the second device to the first device. The proximity may be determined based on geolocation data, such as GPS data, a Bluetooth connection between the first device and the second device, or an indication that the second device is connected to a same network as the first device, such as a home network. If the second device is not proximate to the first device, then, at step 814, the I/O path 1002 transmits the notification to the second device. If the second device is proximate to the first device, then, at step 812, the I/O path 1002 transmits the notification to the first device.

Figure 9:
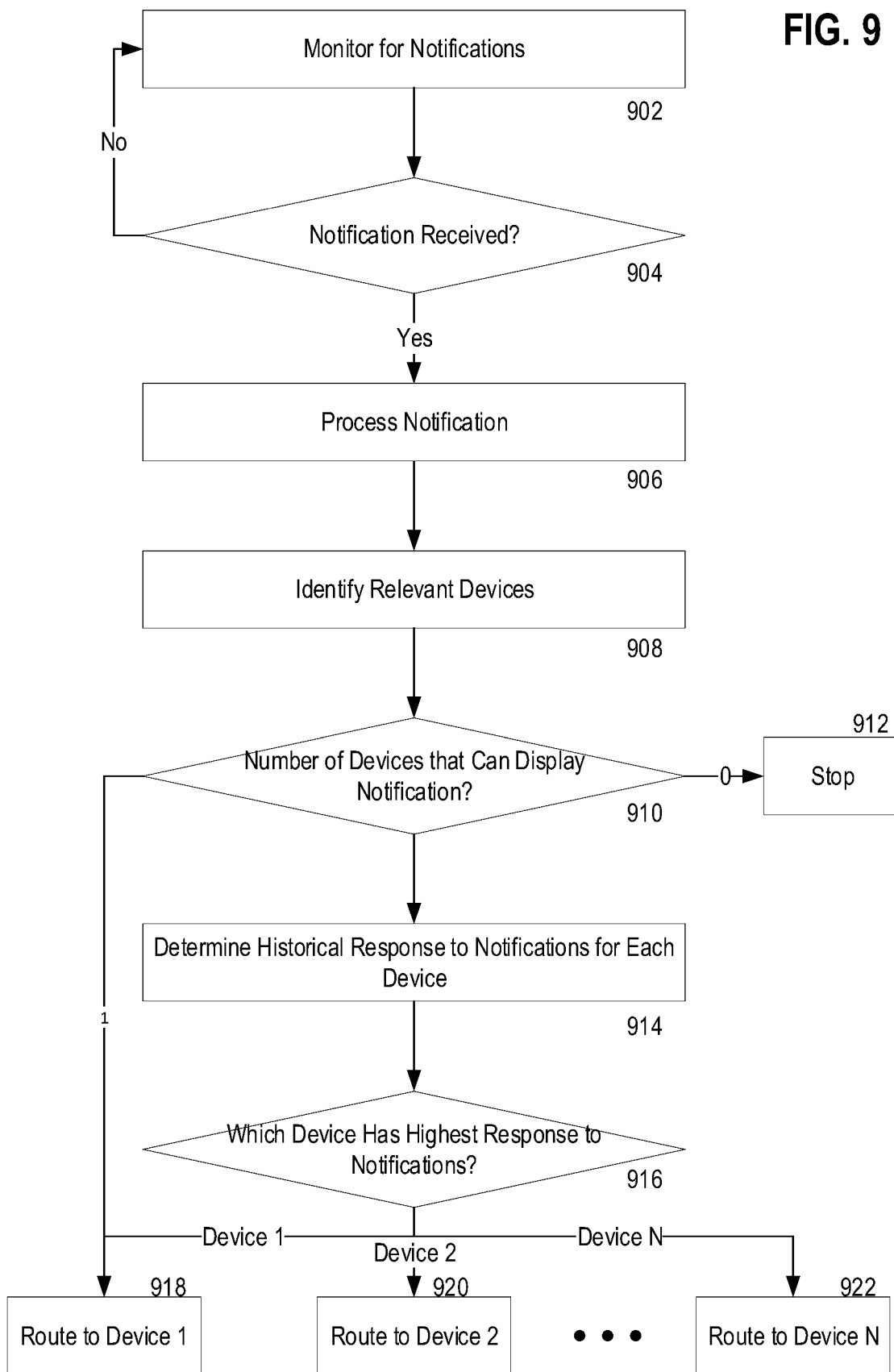
FIG. 9 depicts an example method for dynamically routing notifications based on historical response data, in accordance with some embodiments of the disclosure.
Figure 10:
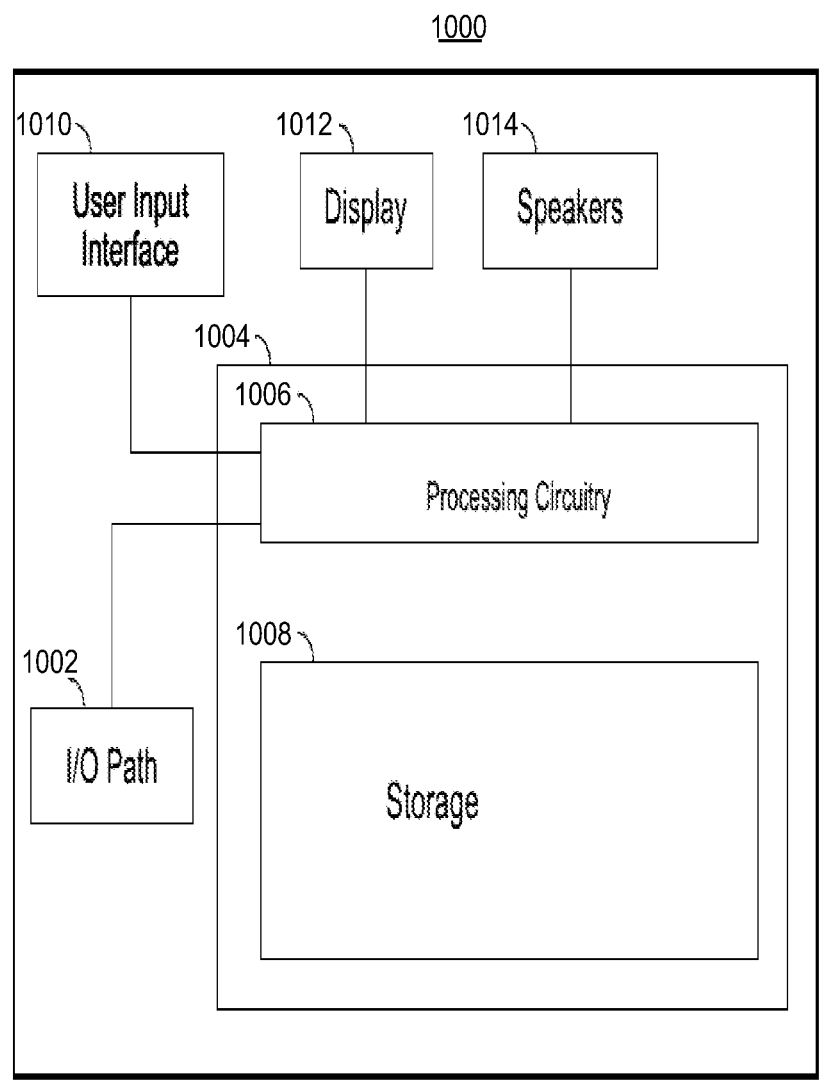
FIG. 10 depicts a block diagram of an illustrative user device, in accordance with some embodiments of the disclosure.

FIG. 9 depicts an example method for dynamically routing notifications based on historical response data. FIG. 9 comprises a practical example of the method of FIG. 5 where the device statuses include historical responses to notifications for each device. In an embodiment, the practical example of FIG. 9 or other rules for routing notifications are selected based on other information. For example, urgency information may be used to determine whether to base the routing of the notifications on historical application usage information or historical notification response information, with an urgency greater than a threshold value causing the notification to be routed to the device with the highest historical notification response and an urgency less than or equal to a threshold value causing the notification to be routed to a device with the highest historical application usage.

At block 902, the I/O path 1002 monitors for new notifications. For example, a process thread executed by I/O path 1002 on the notification server may be configured to listen for new notifications received by the notification server. The process thread may review incoming communications of the notification server and identify each notification that is received.

At block 904, the I/O path 1002 determines if a new notification has been received. For example, the process thread may monitor the incoming communications and make a determination as to whether any of the incoming communications comprises a notification. If a notification has not been received, the method returns to block 902, and the I/O path 1002 continues to monitor for new notifications.

If a new notification has been received, then, at block 906, the control circuitry 1004 processes the notification. For example, the notification server may be configured to extract relevant data from the notification, such as an application identifier indicating an application that corresponds to the notification, an account identifier indicating an account to which the notification is directed, and/or other information that may be used to route the notification, such as notification contents, a notification type, urgency data, and/or actions to be performed from the notification.

At block 908, the control circuitry 1004 identifies relevant devices. For example, the notification server may access stored data, such as data stored in storage 1008 of FIG. 10, that identifies each device that corresponds to an account identifier. The data may be stored in a database or other suitable datastore such that the control circuitry 1004 is able to identify, from the stored data, each device that corresponds to a particular account identifier. Additionally or alternatively, the notification may be sent with a plurality of device identifiers identifying each device that is executing the application corresponding to the notification or has the application corresponding to the notification installed on the device.

At block 910, the control circuitry 1004 determines a number of devices that can display the notification. For example, the notification server may identify, from the stored data, a number of devices that correspond to the notification. The notification server may further determine capabilities of the devices, such as whether the device is on or whether the device has muted notifications. If the number is 0, then, at block 912, the process ends. If the number is 1, then, at block 918, the control circuitry 1004 routes the notification to the device that is capable of displaying the notification.

If the number of devices that can display the notification is greater than 1, then, at block 914, the control circuitry 1004 determines a historical response to notifications for each device. For example, the notification server may receive and store data indicating previous responses to notifications from the plurality of devices that can display the notification. The historical response data may indicate, of a number of notifications, how many notifications received a particular response. The particular response may comprise a first interaction, such as viewing or dismissing;

a particular type of interaction, such as selecting the notification; or a first interaction of a particular type, such as performing an action corresponding to the notification on the device prior to performing the action corresponding to the notification on any other device. The historical response information may be general for all notifications or specific to notifications of a specific type, of a specific application, with specific contents, of a specific urgency, or any combination thereof.

At block 916, the control circuitry 1004 determines which device has the highest historical response to notifications. For example, the notification server may determine which device has the highest number of interactions with notifications and/or a highest ratio of interactions with notifications to received notifications. By determining historical response to notifications, the notification server routes the notifications to the device on which the notifications are most likely to be viewed. This may be beneficial in instances where notifications are usually viewed on a first device, but the application is most commonly executed on a second device.

At block 918, if device 1 has the highest historical response to notifications, the I/O path 1002 routes the notification to device 1. At block 920, if device 2 has the highest historical response to notifications, the I/O path 1002 routes the notification to device 2. At block 922, if device N has the highest historical response to notifications, the I/O path 1002 routes the notification to device N. For example, the notification server may append a device identifier as a destination address to the notification and transmit the notification over a network to the selected device. In an embodiment, the transmission is performed in response to a request from a device with the matching device identifier for new notifications.

Figure 12:
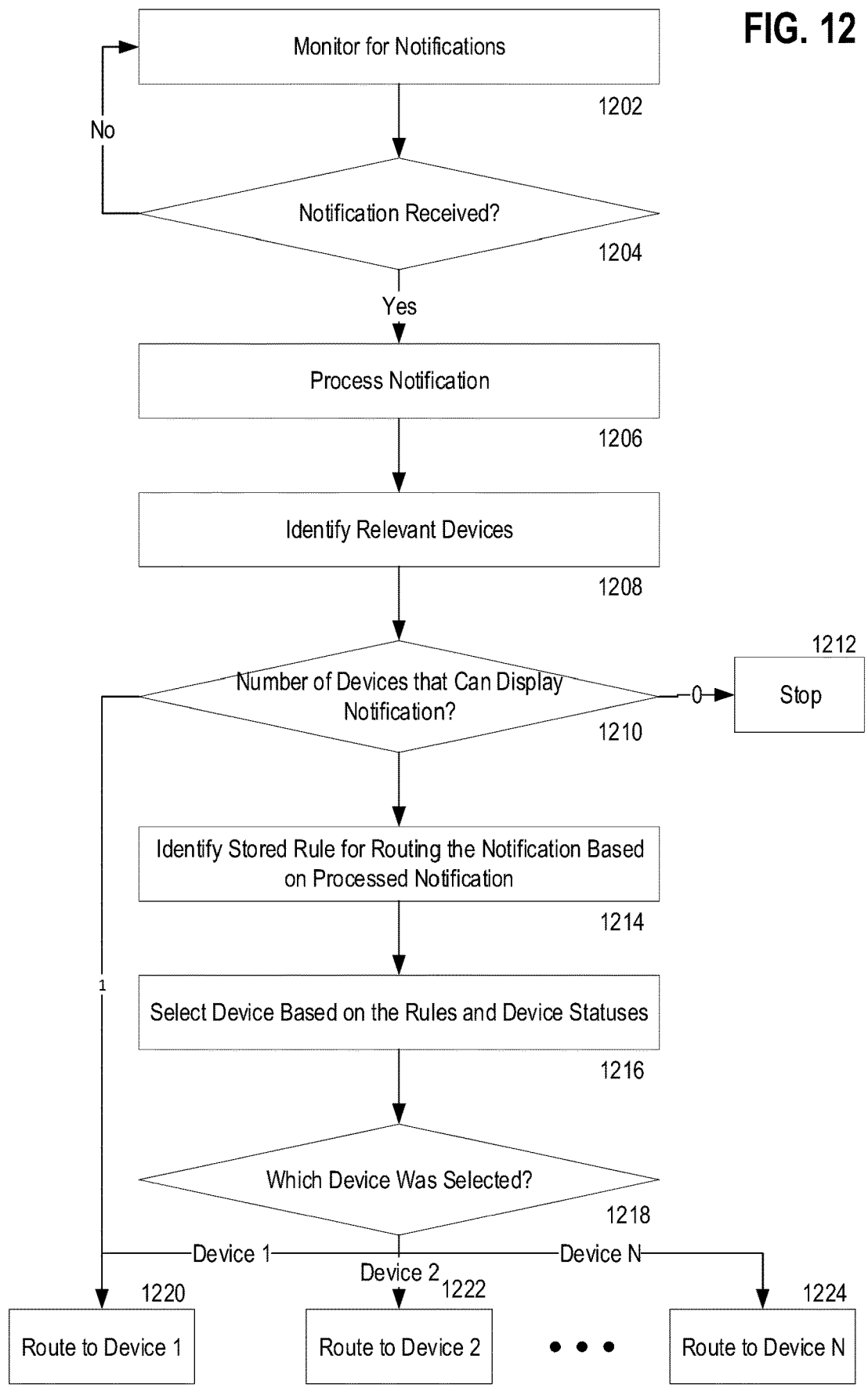
FIG. 12 depicts an example method for dynamically routing notifications based on dynamically identified rules based on the received notification.

FIG. 12 depicts an example method for dynamically routing notifications based on dynamically identified rules based on the received notification. FIG. 12 comprises a practical example of the method of FIG. 5 where the rules for routing notifications are selected based on data relating to the notification.

At block 1202, the I/O path 1002 monitors for new notifications. For example, a process thread executed by I/O path 1002 on the notification server may be configured to listen for new notifications received by the notification server. The process thread may review incoming communications of the notification server and identify each notification that is received.

At block 1204, the I/O path 1002 determines if a new notification has been received. For example, the process thread may monitor the incoming communications and make a determination as to whether any of the incoming communications comprises a notification. If a notification has not been received, the method proceeds to block 1202, and the I/O path 1002 continues to monitor for new notifications.

If a new notification has been received, then, at block 1206, the control circuitry 1004 processes the notification. For example, the notification server may be configured to extract relevant data from the notification, such as an application identifier indicating an application that corresponds to the notification, an account identifier indicating an account to which the notification is directed, and/or other information that may be used to route the notification, such as notification contents, a notification type, urgency data, and/or actions to be performed from the notification.

At block 1208, the control circuitry 1004 identifies relevant devices. For example, the notification server may access stored data, such as data stored in storage 1008 of FIG. 10, that identifies each device that corresponds to an account identifier. The data may be stored in a database or other suitable datastore such that the control circuitry 1004 is able to identify, from the stored data, each device that corresponds to a particular account identifier. Additionally or alternatively, the notification may be sent with a plurality of device identifiers identifying each device that is executing the application corresponding to the notification or has the application corresponding to the notification installed on the device.

At block 1210, the control circuitry 1004 determines a number of devices that can display the notification. For example, the notification server may identify, from the stored data, a number of devices that correspond to the notification. The notification server may further determine capabilities of the devices, such as whether the device is on or whether the device has muted notifications. If the number is 0, then, at block 1212, the process ends. If the number is 1, then, at block 1220, the I/O path 1002 routes the notification to the device that is capable of displaying the notification.

If the number of devices that can display the notification is greater than 1, then, at block 1214, the control circuitry 1004 identifies a rule to apply for routing the notification based on the processed notification. The different rules may be applied to different groups of devices, such as when a notification is received for a first application that is installed on a first plurality of devices and a second notification is received for a second application that is installed on a second plurality of devices. While the first plurality of devices may have overlap in devices with the second plurality of devices, the first plurality of devices may include a device that is not included in the second plurality of devices. The different rules may additionally relate to different device statuses. Thus, the notification server may request different sets of device statuses from the plurality of devices and/or review different stored device statuses of the plurality of devices to identify a device to which to route the notifications.

In an embodiment, one of the stored rules identifies a particular type of device that is to receive the notification if certain conditions are met. For example, the notification server may be configured to transmit a notification relating to a new episode of a television show to a television if the television is determined to be turned on and proximate to a user and/or user device. As another example, the notification server may be configured to transmit the notification to a device that is capable of performing an action associated with the notification. For instance, if the notification includes an in-game reward for a game, the notification server may be configured to route the notification to a device that is capable of executing the game to the extent that the reward can be obtained. As another example, the notification server may be configured to transmit the notification to a device that is connected to a particular network. For example, a first rule may cause a notification relating to a download to be only transmitted to a device that is connected over a WiFi connection, while a second rule may cause a notification with a high urgency to be transmitted to a device that is connected to a mobile network, such as a long-term evolution (LTE) network.

The conditional rules described above may additionally be combined with other device statuses, such as when a plurality of devices meet the conditions of the rule. For instance, the system may filter devices by devices that are capable of performing the action and then rank the devices by historical application usage, historical notification response, proximity of the device to the user, last used, or priority score computed as described further herein.

In an embodiment, the rule is determined based on an application identifier that is received with the notification. For example, the notification may include a header that identifies an application to which the notification corresponds. The notification server may store data identifying different routing rules for notifications corresponding to different applications, such as in storage 1008 of FIG. 10. Based on the application identifier, the notification server may identify the rule corresponding to the application identified by the application identifier and route the notification according to the identified rule. Thus, if two notifications with different application identifiers are received where both applications are stored on the same plurality of devices with the same device statuses, the notification server may route a first of the two notifications to a first device and the second of the two notifications to a second device despite the devices having the same status parameters when the notifications are received because different rules are applied to the different notifications.

In an embodiment, the rule is determined based on a type of notification. The notification type may be identified based on a type identifier received with the notification, such as in notification metadata or a header of the notification. Thus, two notifications received for a same application may be routed to different devices based on different rules determined by the different types of notification. For example, a notification from a book application that has a type of "new book recommendations" may follow a rule based on application usage, while a notification from the book application that has a type of "fraudulent sign-on alert" may follow a rule based on proximity to the device.

In an embodiment, the rule is determined based on an urgency of the notification. The urgency may comprise an urgency value and/or designation that is received along with the notification, such as in a header or in metadata of the notification. Additionally or alternatively, the notification server may determine the urgency of the notification through linguistic analysis of the contents of the notification. For example, contents of a text message may be reviewed for keywords such as "accident," "hospital," "emergency," or "injury." Identification of keywords in the message may cause the notification server to identify the text message as urgent. Any other known linguistic analysis of text data may be used to identify the urgency of the message. Thus, two notifications received for a same application and of a same type may be routed to different devices determined by the notifications being identified as having different determined urgencies.

At block 1216, the control circuitry 1004 selects a device based on the identified rule and the device statuses. For example, the notification server may select a device based on device statuses for each of the plurality of devices as described previously herein. Additionally or alternatively, the notification server may initially, prior to sending the notification to the first device, identify an order of priority for the plurality of devices based on device statuses. Thus, the determination of the next device to which the notification is sent may be performed prior to the notification being sent to the first device.

At block 1218, the control circuitry 1004 determines which device was selected. For example, the notification server may identify a device identifier that corresponds to the device selected at step 1216 based on device statuses for the plurality of devices and the identified rule.

At block 1220, if device 1 has the highest historical response to notifications, the I/O path 1002 routes the notification to device 1. At block 1222, if device 2 has the highest historical response to notifications, the I/O path 1002 routes the notification to device 2. At block 1224, if device N has the highest historical response to notifications, the I/O path 1002 routes the notification to device N. For example, the notification server may append a device identifier as a destination address to the notification and transmit the notification over a network to the selected device. In an embodiment, the transmission is performed in response to a request from a device with the matching device identifier for new notifications.

Example Implementation: Hardware and Software Overview

FIG. 10 depicts a generalized embodiment of an illustrative device (e.g., user device 108A, 108B, or 108C) that executes an application and receives notifications for the executed application or of a notification server that routes notifications to a client device. Device 1000 may be any of a plurality of user devices such as a smartphone, a tablet, personal computer, set-top box, server computer, etc. (discussed further below with respect to FIG. 11). Device 1000 may receive the notification data via input/output (hereinafter "I/O") path 1002. I/O path 1002 may provide a notification data, application updates, or other data to control circuitry 1004, which includes processing circuitry 1006 and storage 1008. Control circuitry 1004 may be used to send and receive commands, requests, and other suitable data using I/O path 1002. I/O path 1002 may comprise circuitry that connects control circuitry 1004 (and specifically processing circuitry 1006) to one or more communications paths (described below in relation to FIG. 11). I/O functions may be provided by one or more of these communications paths but are shown as a single path in FIG. 10 to avoid overcomplicating the drawing. I/O path 1002 may comprise circuitry for transmitting messages over network 1114 for example, when directed by control circuitry 1004 to transmit said messages. In some embodiments, I/O path 1002 may comprise circuitry that includes wires and/or busses connected to a physical network port, e.g. an ethernet port, a wireless WiFi port, cellular communication port, or any other type of suitable physical port.

Control circuitry 1004 may be based on any suitable processing circuitry such as processing circuitry 1006. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 1004 executes instructions for an application stored in memory (e.g., memory 1008). In some implementations, any action performed by control circuitry 1004 may be based on instructions received from an application executing on device 1000.

The circuitry described herein, including, for example, tuning, audio generating, encoding, decoding, encrypting, decrypting, scaler, and analog/digital circuitry, may be implemented using software running on one or more general purpose or specialized processors. If storage 1008 is provided as a separate device from user equipment device 1000, the tuning and encoding circuitry may be associated with storage 1008.

Storage 1008 may be any device for storing electronic data, such as random-access memory, solid state devices, quantum storage devices, hard disk drives, non-volatile memory or any other suitable fixed or removable storage devices, and/or any combination of the same. Control circuitry 1004 may allocate portions of storage 1008 for various purposes such as caching application instructions, recording media assets, storing portions of a media asset, buffering segments of media, etc. As described herein, storage 1008 may be used to store one or more LUTs storing a number of MAC addresses associated with a plurality of user equipment devices and their corresponding profile information.

A user may send instructions to control circuitry 1004 using user input interface 1010. User input interface 1010 may be any suitable user input interface, such as a remote control, mouse, trackball, keypad, keyboard, touchscreen, touchpad, stylus input, joystick, voice recognition interface, or other user input interfaces. Instructions to control circuitry 1004 may be transmitted through I/O path 1002, which could consist of a video tracking and detection mechanism, Internet of Things (IoT) and home automation triggers, emergency alert systems, and software or hardware communication pipelines and/or notification centers.

Display 1012 may be provided as a stand-alone device or integrated with other elements of each one of user equipment device 1000. For example, display 1012 may be a touchscreen or touch-sensitive display, a projector, or a casting device. In such circumstances, user input interface 1010 may be integrated with or combined with display 1012. Display 1012 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 1012. In some embodiments, the graphics processing circuitry may be external to processing circuitry 1006 (e.g., as a graphics processing card that communicates with processing circuitry 1006 via I/O path 1002) or may be internal to processing circuitry 1006 or control circuitry 1004 (e.g., on a same silicon die as control circuitry 1004 or processing circuitry 1006). In some embodiments, the graphics processing circuitry may be used to receive, display, and play content.

Speakers 1014 may be provided as integrated with other elements of user equipment device 1000 or may be stand-alone units. The audio component of videos and other content displayed on display 1012 may be played through speakers 1014. In some embodiments, the audio may be distributed to a receiver (not shown), which processes and outputs the audio via speakers 1014. The speakers 1014 may be part of, but not limited to, a home automation system.

Streaming applications may be, for example, stand-alone applications implemented on user devices. For example, the streaming application may be implemented as software or a set of executable instructions, which may be stored in non-transitory storage 1008 and executed by control circuitry 1004 of a user device 1102, 1104, 1106. In such an approach, instructions of the streaming application are stored locally (e.g., in storage 1008), and data for use by the application is downloaded on a periodic basis (e.g., from an out-of-band feed, from an Internet resource, or using another suitable approach). Control circuitry 1004 may retrieve instructions of the streaming application from storage 1008 and process the instructions to generate any of the displays discussed herein. Based on the processed instructions, control circuitry 1004 may determine what action to perform when user input is received from input interface 1010.

Figure 11:
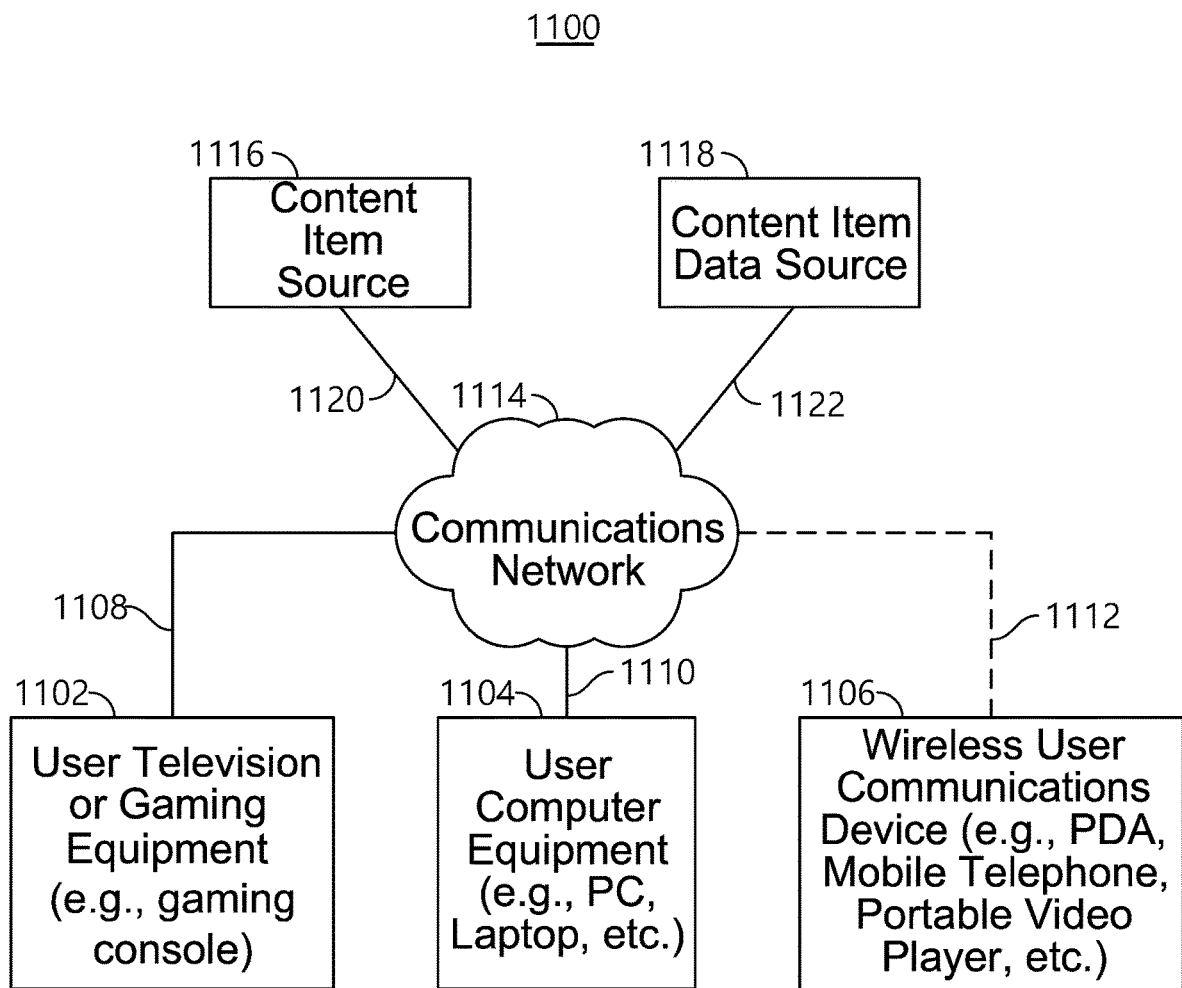
FIG. 11 depicts a block diagram of an illustrative media system, in accordance with some embodiments of the disclosure.

FIG. 11 depicts an exemplary media system in accordance with some embodiments of the disclosure, in which user equipment device 108A, 108B, 108C, and user equipment device 1000 can be implemented in the media system 1100 of FIG. 11 as user television equipment 1102, user computer equipment 1104, wireless user communications device 1106, or any other type of user equipment suitable for accessing media. For simplicity, these devices may be referred to herein collectively as user equipment or a user device. User equipment, on which the media application or the streaming application is implemented, may function as a stand-alone device or may be part of a network of devices. Various network configurations of devices may be implemented and are discussed in more detail below.

User television equipment 1102 may include a set-top box, an integrated receiver decoder (IRD) for handling satellite television, a television set, a digital storage device, or other user television equipment. One or more of these devices may be integrated to be a single device, if desired. User computer equipment 1104 may include a PC, a laptop, a streaming content aggregator, a PC media center, or other user computer equipment. It may include devices like digital assistance, smart speakers, and/or home automation. Wireless user communications device 1106 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 1100, there are typically more than one of each type of user equipment, but only one of each is shown in FIG. 11 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 is used by the user equipment to obtain the video stream. Communications network 1114 may be one or more networks including the Internet, a mobile phone network, ad-hoc network, or other types of communications network or combination of communications networks. Paths 1108, 1110, and 1112 may separately or together include one or more communications paths, including any suitable wireless communications path. Path 1112 is drawn as a dotted line to indicate it is a wireless path. Communications with the user equipment may be provided by one or more of these communications paths but are shown as a single path in FIG. 11 to avoid overcomplicating the drawing. The user equipment devices may communicate with each other directly through an indirect path via communications network 1114.

System 1100 includes content item source 1116 and content item data source 1118 coupled to communications network 1114 via communications paths 1120 and 1122, respectively. Paths 1120 and 1122 may include any of the communications paths described above in connection with paths 1108, 1110, and 1112. Communications with the content item source 1116 and content item data source 1118 may be exchanged over one or more communications paths but are shown as a single path in FIG. 11 to avoid overcomplicating the drawing. In addition, there may be more than one of each of content item source 1116 and content item data source 1118, but only one of each is shown in FIG. 11 to avoid overcomplicating the drawing. In some embodiments, content item source 1116 and content item data source 1118 are integrated as one source device. Although communications between sources 1116 and 1118 with user equipment are shown as through communications network 1114, in some embodiments, sources 1116 and 1118 may communicate directly with user equipment devices 1102, 1104, and 1106 via communications paths (not shown) such as those described above in connection with paths 1108, 1110, and 1112.

Content item source 1116 or content item data source 1118 may include one or more types of media distribution equipment such as a media server, cable system headend, satellite distribution facility, intermediate distribution facilities and/or servers, Internet providers, on-demand media servers, and other media providers. Content item source 1116 or content item data source 1118 may be the originator of media content or may not be the originator of media content. Content item source 1116 or content item data source 1118 may also include a remote media server used to store different types of media content (including a media asset selected by a user), in a location remote from any of the user equipment. Systems and methods for providing remotely stored media to user equipment are discussed in greater detail in connection with Ellis et al., U.S. Pat. No. 7,761,892, issued Jul. 20, 2010, which is hereby incorporated by reference herein in its entirety.

System 1100 is intended to illustrate a number of approaches, or network configurations, by which user equipment devices and sources of media content and guidance data may communicate with each other for the purpose of accessing media and data related to the media. The configuration of the devices and paths in system 1100 may change without departing from the scope of the present disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 1000, 1100 and 1300 can be performed on any of the devices shown in FIGS. 10-15. Additionally, any of the steps in processes 1000, 1100 and 1300 can be performed in any order, can be omitted, and/or can be combined with any of the steps from any other process.

What is claimed is:

1. A method comprising:
   receiving a digital electronic notification directed to a user account;
   identifying a plurality of devices corresponding to the user account on which is installed an application corresponding to the digital electronic notification;
   determining a plurality of current status parameters of each of the plurality of devices, wherein the plurality of current status parameters comprises two or more of: (a) a determined proximity of the device to a user of the device, (b) device settings that affect alerts, (c) device health information, (d) a time when the device last displayed media through an application, or (e) user preference information relating to the application;
   computing, based on the plurality of current status parameters, a priority score for each of the plurality of devices;
   based, at least in part, on the priority score for each of the plurality of devices, selecting a particular device of the plurality of devices to receive the digital electronic notification;
   determining whether the particular device is optimal for displaying the digital electronic notification;
   in response to determining that the particular device is optimal for displaying the digital electronic notification, transmitting the digital electronic notification to the particular device; and
   in response to determining that the particular device is not optimal for displaying the digital electronic notification, selecting, based at least in part on the priority score for each of the plurality of devices, a different device of the plurality of devices.

2. The method of claim 1, wherein the selecting the particular device comprises determining that a particular priority score computed for the particular device exceeds the priority score computed for each other device of the plurality of devices.

3. The method of claim 1, wherein the plurality of current status parameters comprises two or more of a determined proximity of the device to a user of the device, device settings that affect alerts, device health information, or user preference information relating to the application.

4. The method of claim 1, further comprising:
   determining that a threshold period of time has passed without the notification being viewed;
   in response to the determining that the threshold period of time has passed without the notification being viewed, identifying, based on the priority score of each of the plurality of devices excluding the particular device, a second device of the plurality of devices to receive the digital electronic notification; and
   transmitting the digital electronic notification to the second device.

5. The method of claim 4, further comprising:
   receiving, from the particular device, an analysis of the electronic digital notification indicating an urgency of the electronic digital notification;
   sending the digital electronic notification to the second device in response to the determining that the threshold period of time has passed and that the urgency of the electronic digital notification is greater than a threshold urgency.

6. The method of claim 1, further comprising:
   receiving, from the particular device, an analysis of the electronic digital notification indicating an urgency of the electronic digital notification;

determining that the urgency of the electronic digital notification is greater than a threshold urgency and, in response, sending the digital electronic notification to a second device of the plurality of devices.

7. The method of claim 1, further comprising:
determining that a second device has a highest priority score;
determining that the second device has a device setting that affects notifications and, in response, identifying the particular device as having the second highest priority score and performing the selecting of the particular device.

8. The method of claim 1, further comprising:
determining that a second device has a highest priority score;
determining that a battery life of the second device is less than a threshold value and, in response, identifying the particular device as having the second highest priority score and performing the selecting of the particular device.

9. The method of claim 1, further comprising:
determining that a second device has a highest priority score;
determining that the second device has not been used in greater than a threshold period of time and, in response, identifying the particular device as having the second highest priority score and performing the selecting of the particular device.

10. The method of claim 1, further comprising:
determining that a second device has a highest priority score;
determining that the second device is not proximate to a user of the second device and, in response, identifying the particular device as having the second highest priority score and performing the selecting of the particular device.

11. The method of claim 1, wherein the priority score for a particular device of the plurality of device is determined at least based on a data-structure that assigns different numerical scores to different ranges of time periods that have passed since the particular device last displayed media through an application.

12. A system comprising:
input/output circuitry configured to receive a digital electronic notification directed to a user account;
control circuitry configured to:
identify a plurality of devices corresponding to the user account on which is installed an application corresponding to the digital electronic notification;
determine a plurality of current status parameters of each of the plurality of devices, wherein the plurality of current status parameters comprises two or more of: (a) a determined proximity of the device to a user of the device, (b) device settings that affect alerts, (c) device health information, (d) a time when the device last displayed media through an application, or (e) user preference information relating to the application;
compute, based on the plurality of current status parameters, a priority score for each of the plurality of devices;
based, at least in part, on the priority score for each of the plurality of devices, select a particular device of the plurality of devices to receive the digital electronic notification;
determine whether the particular device is optimal for displaying the digital electronic notification;
in response to determining that the particular device is optimal for displaying the digital electronic notification, transmit the digital electronic notification to the particular device; and
in response to determining that the particular device is not optimal for displaying the digital electronic notification, select, based at least in part on the priority score for each of the plurality of devices, a different device of the plurality of devices.

13. The system of claim 12, wherein the control circuitry is further configured to:
determine that a second device has a highest priority score;
determine that a battery life of the second device is less than a threshold value and, in response, identify the particular device as having the second highest priority score and performing the selecting of the particular device.

14. The system of claim 12, wherein the control circuitry is further configured to:
determine that a threshold period of time has passed without the notification being viewed;
in response to the determining that the threshold period of time has passed without the notification being viewed, identify, based on the priority score of each of the plurality of devices excluding the particular device, a second device of the plurality of devices to receive the digital electronic notification;
wherein the input/output circuitry is further configured to transmit the digital electronic notification to the second device.

15. The system of claim 14, wherein:
the control circuitry is further configured to receive, from the particular device, an analysis of the electronic digital notification indicating an urgency of the electronic digital notification;
the input/output circuitry is further configured to transmit the digital electronic notification to the second device in response to the determining that the threshold period of time has passed and that the urgency of the electronic digital notification is greater than a threshold urgency.

16. The system of claim 12, wherein the control circuitry is further configured to:
receive, from the particular device, an analysis of the electronic digital notification indicating an urgency of the electronic digital notification;
determine that the urgency of the electronic digital notification is greater than a threshold urgency and, in response, send the digital electronic notification to a second device of the plurality of devices.

17. The system of claim 12, wherein, when selecting the particular device, the control circuitry is further configured to determine that a particular priority score computed for the particular device exceeds the priority score computed for each other device of the plurality of devices.

18. The system of claim 17, wherein the plurality of device parameters comprises two or more of a determined proximity of the device to a user of the device, device settings that affect alerts, device health information, or user preference information relating to the application.

19. The system of claim 12, wherein the control circuitry is configured to:
determine that a second device has a highest priority score;
determine that the second device has not been used in greater than a threshold period of time and, in response, identify the particular device as having the second highest priority score and performing the selecting of the particular device.

20. The system of claim 19, wherein the control circuitry is configured to:
determine that a second device has a highest priority score;
determine that the second device is not proximate to a user of the second device and, in response, identifying the particular device as having the second highest priority score and performing the selecting of the particular device.

* * * * *